United States Patent
Hashimoto et al.

(10) Patent No.: US 8,094,337 B2
(45) Date of Patent: Jan. 10, 2012

(54) DEVICE AND SYSTEM FOR ASSISTING PRINTER SELECTION THROUGH A NETWORK

(75) Inventors: Yoko Hashimoto, Yokohama (JP); Takahiro Fujishiro, Yokohama (JP); Tadashi Kaji, Yokohama (JP); Akifumi Yato, Kawasaki (JP); Kazuyoshi Hoshino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 986 days.

(21) Appl. No.: 11/987,551

(22) Filed: Nov. 30, 2007

(65) Prior Publication Data

US 2008/0158597 A1 Jul. 3, 2008

(30) Foreign Application Priority Data

Dec. 12, 2006 (JP) .................................. 2006-334195

(51) Int. Cl.
*G06F 3/12* (2006.01)
(52) U.S. Cl. ......... 358/1.15; 358/1.1; 358/400; 358/440
(58) Field of Classification Search .................. 358/1.1, 358/1.15, 400, 402, 434, 440, 468
See application file for complete search history.

(56) References Cited

U.S. PATENT DOCUMENTS

| | | | |
|---|---|---|---|
| 2004/0160636 A1* | 8/2004 | Kondo et al. ............... | 358/1.15 |
| 2005/0105130 A1 | 5/2005 | Hagiuda | |

FOREIGN PATENT DOCUMENTS

| | | | |
|---|---|---|---|
| JP | 2004-213393 | | 7/2004 |
| JP | 2005-149094 | | 6/2005 |
| JP | 2006-048229 | | 2/2006 |
| JP | 2006048229 A | * | 2/2006 |
| JP | 2006-134091 | | 5/2006 |

OTHER PUBLICATIONS

Japanese Notification of Reasons for Refusal, w/ English translation thereof, issued in Japanese Patent Application No. 2006-334195, dated Jun. 21, 2011.

* cited by examiner

*Primary Examiner* — Thomas D Lee
(74) *Attorney, Agent, or Firm* — McDermott Will & Emery LLP

(57) ABSTRACT

To minimize risk of printing-out to a printer located at an improper base, where a network is established between the bases, terminal devices, a server, printers, and a management device which manages printers are provided. The management device manages position information of the printers installed in bases. Every time printing is requested, the management device extracts printer candidates located close to a terminal device and asks a user of the terminal device to select one of the printer candidates. The user visually confirms the installation locations of the extracted printer candidates included in a list and selects an appropriate printer for each printing. Accordingly, risk of erroneously printing using a printer installed in an improper base can be reduced.

16 Claims, 15 Drawing Sheets

FIG. 4

| PRINTER IDENTIFIER | INSTALLATION ENVIRONMENTAL INFORMATION | | INSTALLATION LOCATION |
|---|---|---|---|
| | IP ADDRESS | SUBNETMASK | |
| pri1@aaa.bbb | 192.168.1.5 | 255.255.255.0 | SOUTH SIDE OF 16TH FLOOR OF EAST BUILDING |
| pri2@aaa.bbb | 192.168.1.10 | 255.255.255.0 | NORTH SIDE OF 16TH FLOOR OF EAST BUILDING |
| priA@xxx.yyy | 192.168.7.7 | 255.255.255.0 | Printer_map_honsha.jpg |

FIG. 15

PRINTER CANDIDATE LIST DISPLAY ITEMS

| PRINTER CANDIDATES | | |
|---|---|---|
| 1701 | 1702 | 1703 |
| PRINTER NAME | INSTALLATION LOCATION | REMARKS |
| pri1@aaa.bbb | SOUTH SIDE OF 16TH FLOOR OF EAST BUILDING | IP ADDRESS : 192.168.1.5 SUBNETMASK : 255.255.255.0 |
| pri3@xxx.yyy | map.jpg CLICK HERE TO DISPLAY MAP | IP ADDRESS : 192.168.1.15 SUBNETMASK : 255.255.255.0 |

DEVICE AND SYSTEM FOR ASSISTING PRINTER SELECTION THROUGH A NETWORK

INCORPORATION BY REFERENCE

This application claims priority based on a Japanese patent application, No. 2006-334195 filed on Dec. 12, 2006, the entire contents of which are incorporated herein by reference.

BACKGROUND OF THE INVENTION

The present invention relates to a technique of performing printing through a network.

In general companies and public offices, multiple bases, each having a local area network (LAN) therein, are generally connected to each other through a network. In many cases, a network printer that receives a print request through the network and performs printing is connected to the base LAN.

Japanese Patent Laid-open Publication No. 2006-48229 (hereinafter, referred to as Patent Document 1) discloses a system in which a server for managing printers provided for each base is used to efficiently utilize the printers. In the system, when a printer to be used for printing in the base is registered, the following setting assistance is applied to a client terminal device connected to the LAN at the base.

The client terminal device requests the printer management server to send a list of printers which can be used in the base.

The printer management server searches for printers provided in the base, obtains printer candidates, and sends the Internet Protocol (IP) addresses of the printer candidates to the client terminal device.

When a user views the sent IP addresses of the printer candidates and selects one printer, the client terminal device sends the IP address of the selected printer to the printer management server.

The printer management server sends a printer driver and its setting information which are required to use the selected printer, to the client terminal device.

Upon reception of the printer driver and the setting information, the client terminal device installs a driver program in itself.

In Patent Document 1 also, it is described that the client terminal device uninstalls the installed driver program when the client terminal device is turned off.

In Patent Document 1 also, it is described that the IP address of the client terminal device is used as information which is used when the printer management server searches for the printers. In an example described, when an IP address is assigned by a dynamic host configuration protocol (DHCP), for example, a group is specified to define a range in which the IP address is assigned, and a printer list corresponding to the group is searched.

By using the IP address and a DHCP group, the printer management server can estimate a connection position of the client terminal device and appropriately select a printer.

The invention described in Patent Document 1 allows the user to easily set and use a printer installed in a base where the user is temporarily staying on a business trip, for example.

SUMMARY OF THE INVENTION

In the invention described in Patent Document 1, printer candidates that perform printing in a base, to which the client terminal device is connected, are presented, so the user can easily set a printer to be used for printing.

However, whether to set the printer depends greatly on the user's intention. When the user voluntarily selects not to set the printer or when the user forgets to set the printer, the printer is not set.

In such a case, when printing is requested, print data is sent to a default printer which is originally set to the client terminal device, and the print data may be outputted to a printer of a base different from the base to which the client terminal device is connected. This may lead to leakage of confidential information and is not preferable in terms of security.

The present invention has been made in view of such conventional problems, and the present invention provides a printing system which guides a user in order to be able print using an appropriate printer.

According to an aspect of the present invention, there is provided a printer selection assisting device which assists, in multiple bases which are connected to each other through a network and each of which includes a printer connected to a local network, selection of a printer to be used for printing in response to a print request from a terminal connected to the local network of any one of the multiple bases, the printer selection assisting device including: a printer management information storage unit which associates and stores identification information of the printer of each of the multiple bases and installation environment information of the printer; a candidate extraction request reception unit which receives through the network, when printing is to be performed, from the terminal connected to the local network of any one of the multiple bases, a printer-candidate extraction request that includes installation environment information of the terminal; a printer extraction unit which refers to the printer management information storage unit and extracts, from multiple printers, the identification information and the installation environment information of which are stored in the printer management information storage unit, at least one printer that has installation environment information satisfying a condition determined in advance with respect to the installation environment information of the terminal included in the printer-candidate extraction request received by the candidate extraction request reception unit; and an extracted-printer-information transmission unit which sends the identification information and the installation environment information of the at least one printer extracted by the printer extraction unit, to the terminal.

Further, according to another aspect of the present invention, there is provided a printer selection assisting system in which multiple bases connected to each other through a network are provided with local networks, and a printer, a terminal device, and a printer selection assisting device which assists selection of a printer to be used for printing are connected to any one of the local networks of the multiple bases, the printer selection assisting device including: a management information storage unit which associates and stores identification information of each printer of the multiple bases and installation environment information of the printer; an extraction request reception unit which receives through the network, when printing is to be performed, from the terminal device connected to the local network of any one of the multiple bases, a printer-candidate extraction request that includes installation environment information of the terminal device; a printer extraction unit which refers to the management information storage unit and extracts, from multiple printers, the identification information and the installation environment information which are stored in the management information storage unit, at least one printer that has installation environment information satisfying a condition deter- mined in advance with respect to the installation environment information of the terminal device included in the printer-candidate extraction request received by the extraction request reception unit; and a printer information transmission unit which sends the identification information and the installation environment information of the at least one printer extracted by the printer extraction unit, to the terminal device; the terminal device including: a printer information reception unit which receives the identification information and the installation environment information of the at least one printer sent from the printer information transmission unit; and an installation environment information processing unit which processes the installation environment information received by the printer information reception unit to generate information for display.

Still further, according to another aspect of the present invention, there is provided a printer selection assisting method of assisting, by a printer selection assisting device, selection of a printer to be used for printing, the printer selection assisting device, a printer, and a terminal device being connected to any one of local networks provided for multiple bases that are connected to each other through a network, the printer selection assisting device including a processor, the processor executing the printer selection assisting method which includes: a management information storage step of causing a storage device to store printer management information which associates identification information of each printer of the multiple bases with installation environment information of the printer; an extraction request reception step of receiving, through the network, when printing is to be performed, from the terminal device connected to the local network of any one of the multiple bases, a printer-candidate extraction request that includes installation environment information of the terminal device;

a printer extraction step of referring to the printer management information of the terminal device and extracting, from multiple printers, at least one printer that has installation environment information satisfying a condition determined in advance with respect to the installation environment information of the terminal device included in the printer-candidate extraction request received in the extraction request reception step; a printer information transmission step of sending the identification information and the installation environment information of the at least one printer extracted in the printer extraction step, to the terminal device; the terminal device comprising a processor which executes: a printer information reception step of receiving the identification information and the installation environment information of the at least one printer sent in the printer information transmission step; and an installation environment information processing step of processing the installation environment information received in the printer information reception step to generate information for display.

According to the present invention, even when a number of printers are connected to multiple bases, printer candidates located close to the terminal device can be extracted every time printing is requested, regardless of the user's intent, based on the position information of the terminal device and the printers. Therefore, the user can select a printer from the printer candidates located in places for secure printing.

Further, according to the present invention, since the installation locations of printer candidates can be displayed for the user, risk that a printer is selected with printer position mistaken can be reduced.

These and other benefits are described throughout the present specification. A further understanding of the nature and advantages of the invention may be realized by reference to the remaining portions of the specification and the attached drawings.

BRIEF DESCRIPTION OF THE DRAWINGS

In the accompanying drawings:

FIG. 4 is a diagram showing a configuration of a printer management area;

FIG. 15 is a diagram showing an example in which a printer candidate list is displayed on a screen.

DESCRIPTION OF THE EMBODIMENTS

Hereinafter, a first embodiment of the present invention will be described with reference to FIGS. 1 to 15.

First, a configuration of the first embodiment of the present invention will be described with reference to FIGS. 1 to 6.

Figure 1:
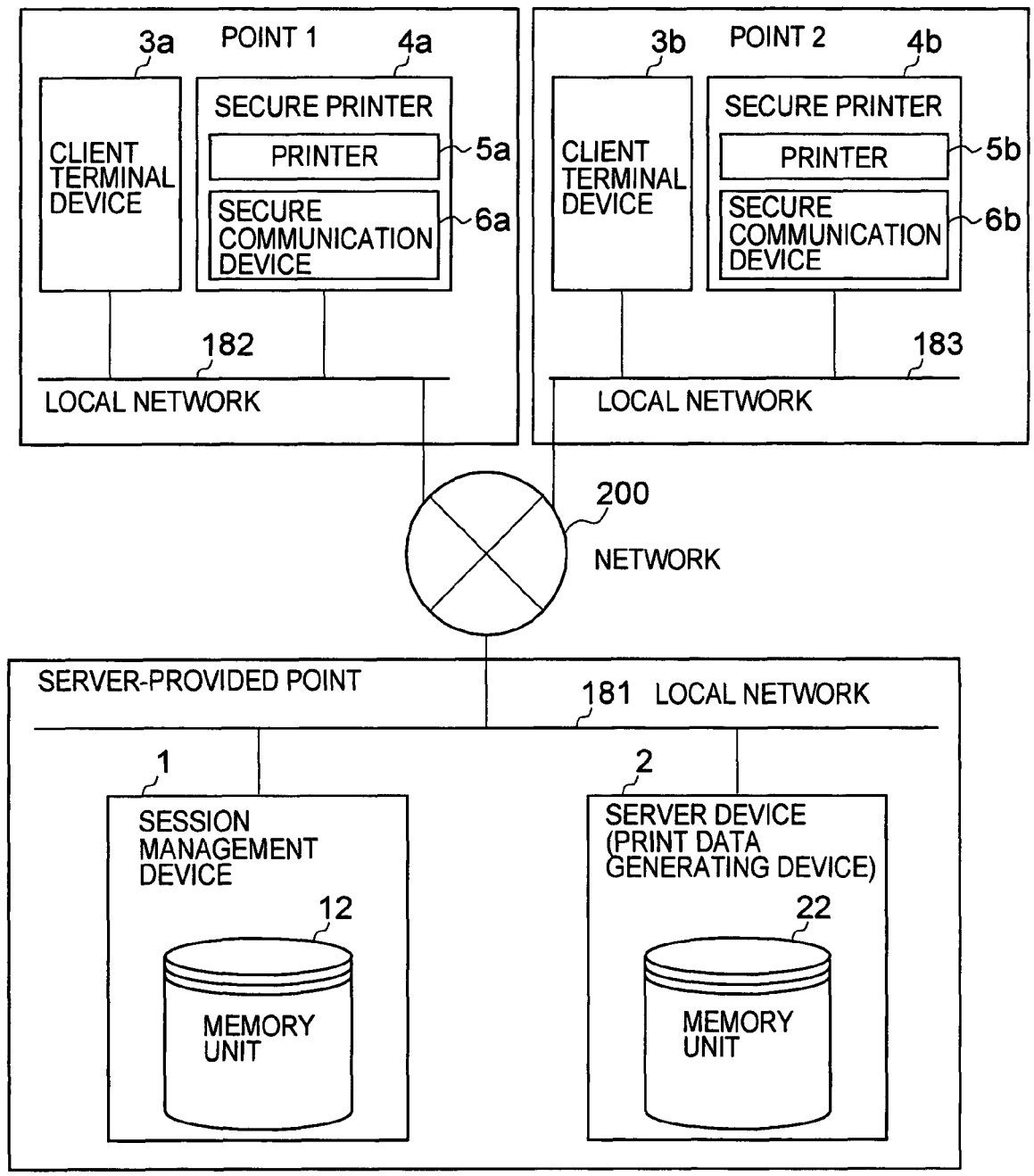
FIG. 1 is a diagram showing a configuration of a printing system according to an embodiment of the present invention.

FIG. 1 is a diagram showing a configuration of a printing system according to the first embodiment of the present invention.

In this embodiment, it is assumed that a base 1 and a base 2 which serve as sales base, and a server-provided base are included. The server-provided base, the base 1, and the base 2 include therein local networks 181, 182, and 183, respectively. The local networks 181, 182, and 183 are connected to each other through a network 200 such as the Internet. A device (not shown) such as a firewall which prevents unauthorized communication from being performed is provided at a connection base between the network 200 and each of the local networks 181, 182, and 183.

The local network 181 of the server-provided base is connected to a session management device 1 which manages communication between communication terminals and to a server device 2 which provides a desktop environment for each user.

Each of the bases 1 and 2 includes a client terminal device 3 (the client terminal device 3 collectively indicates client terminal devices 3a and 3b) which is used by a user, a secure printer 4 (the secure printer 4 collectively indicates secure printers 4a and 4b). The client terminal device 3a and the secure printer 4a are connected to the local network 182. The client terminal device 3b and the secure printer 4b are connected to the local network 183.

The secure printer 4 includes a printer 5 (the printer 5 collectively indicates printers 5a and 5b) and a secure communication device 6 (the secure communication device 6 collectively indicates secure communication devices 6a and 6b). The secure communication device 6 is connected to the printer 5 and provides a secure communication function for communication performed by the printer 5.

Note that the client terminal device 3, the secure printer 4, and the server device 2 are simply referred to as "communication terminals".

Figure 2:
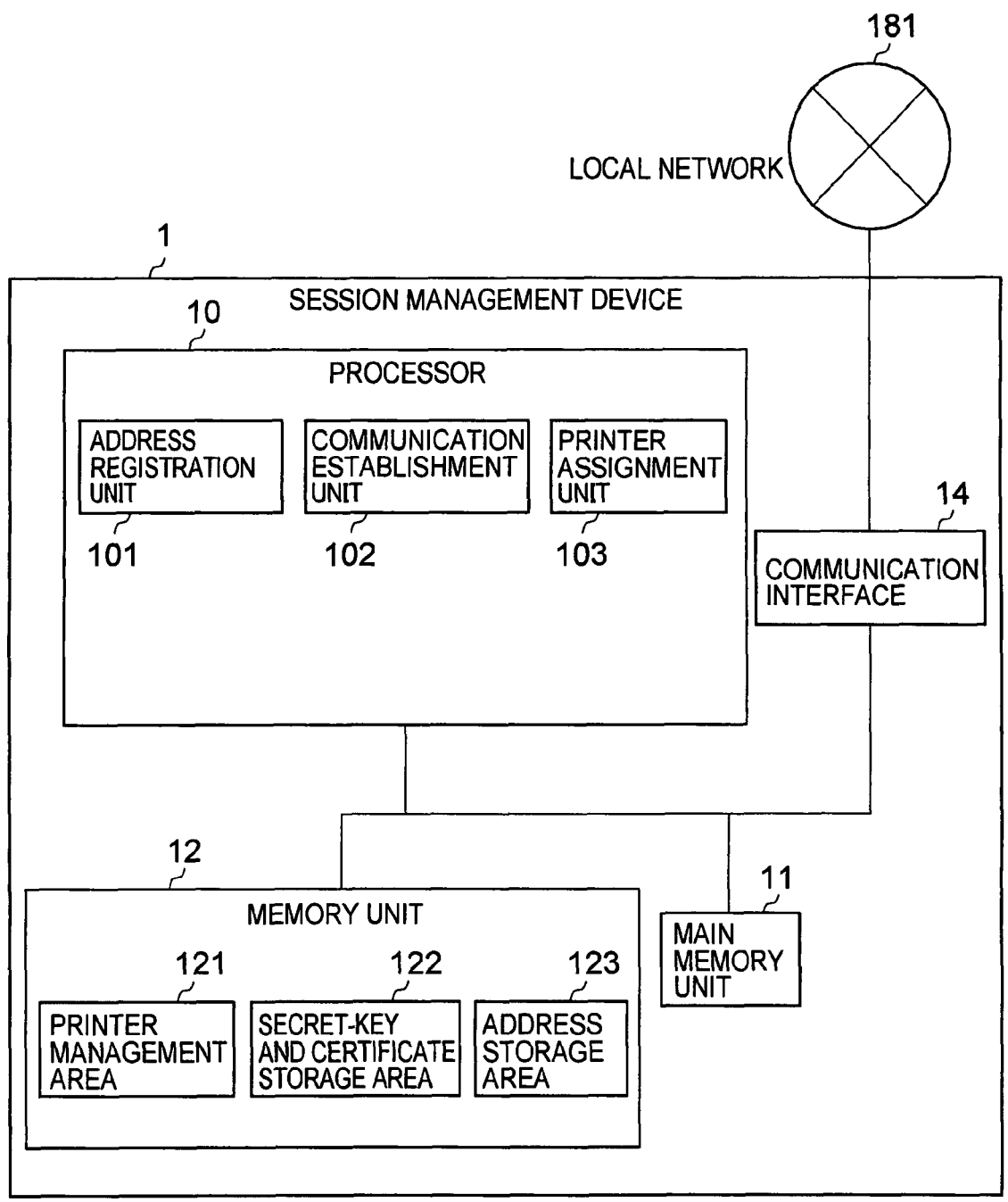
FIG. 2 is a diagram showing a configuration of a session management device.

The session management device 1, which serves as a printer selection assisting device, will be described with reference to FIG. 2.

The session management device 1 includes a processor 10, a main memory unit 11, a memory unit 12, and a communication interface 14 used to perform communication with another device or with another device that is connected to the local network 181, through the local network 181 connected to the session management device 1.

The memory unit 12 stores: a printer management area 121 for storing installation environment information of a printer; a secret-key and certificate storage area 122 for storing a secret key of the session management device 1 and a public key certificate thereof which are used by a communication terminal to authenticate the session management device 1; and an address storage area 123 for storing the address of a communication terminal.

As shown in FIG. 4, the printer management area 121 includes: a printer identifier column 131 for storing a printer identifier which identifies a printer; an installation environment information column 132 formed, for example, of an IP address column 133 and a subnetmask column 134 for information on environment in which the printer is installed; and an installation location column 135.

The processor 10 includes: an address registration unit 101 which registers an address in the address storage area 123 upon reception of an address registration request from a communication terminal and which searches for the address of a communication terminal; a communication establishment unit 102 which generates an encryption key to encrypt communication performed between communication terminals, which distributes the generated encryption key to the communication terminals, and which performs a process up to establishment of an encrypted channel between the communication terminals; and a printer assignment unit 103 which assigns a printer upon reception of a printer search request.

Figure 3:
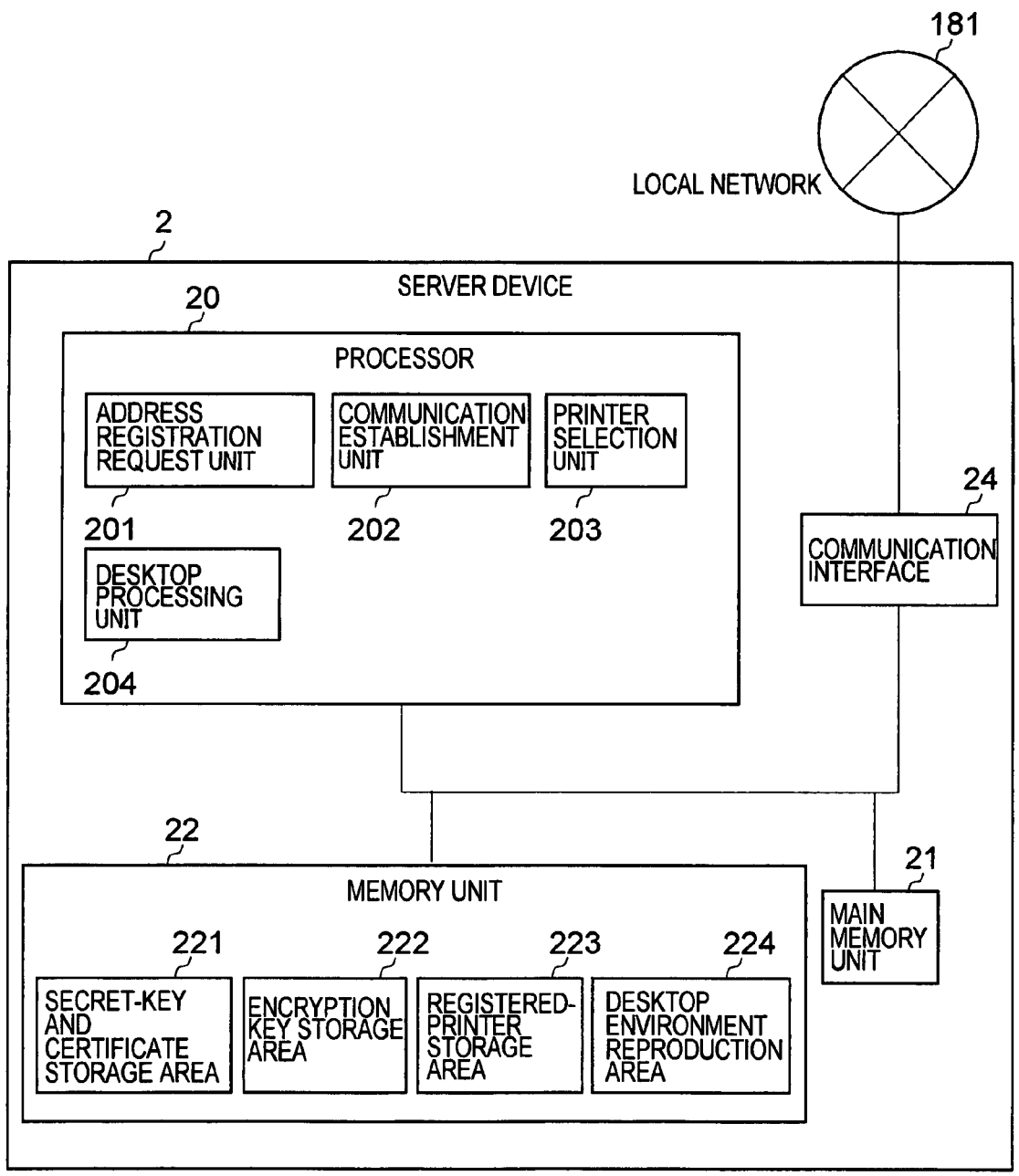
FIG. 3 is a diagram showing a configuration of a server device.

The server device 2 will be described with reference to FIG. 3.

The server device 2 includes a processor 20, a main memory unit 21, a memory unit 22, and a communication interface 24.

The processor 20 includes: an address registration request unit 201 which is used to register, in the session management device 1, an address identifying the position of the server device 2 on the network; a communication establishment unit 202 which performs communication processing with the session management device 1 and also performs communication processing with a communication terminal serving as a communication destination; a printer selection unit 203 which assists processing of selecting an appropriate printer (and which also generates print data); and a desktop processing unit 204 which provides, to a client terminal device 3 which has logged in, a desktop environment corresponding to the user of the client terminal device 3.

The memory unit 22 stores: a secret-key and certificate storage area 221 for storing a secret key of the server device 2 and a public key certificate thereof which are used by the session management device 1 to authenticate the server device 2; an encryption key storage area 222 for storing an encryption key used to encrypt communication; a registered-printer storage area 223 for holding information on a printer which has been once used; and a desktop environment reproduction area 224 for storing data used to reproduce a desktop environment of the client terminal device 3.

Figure 5:
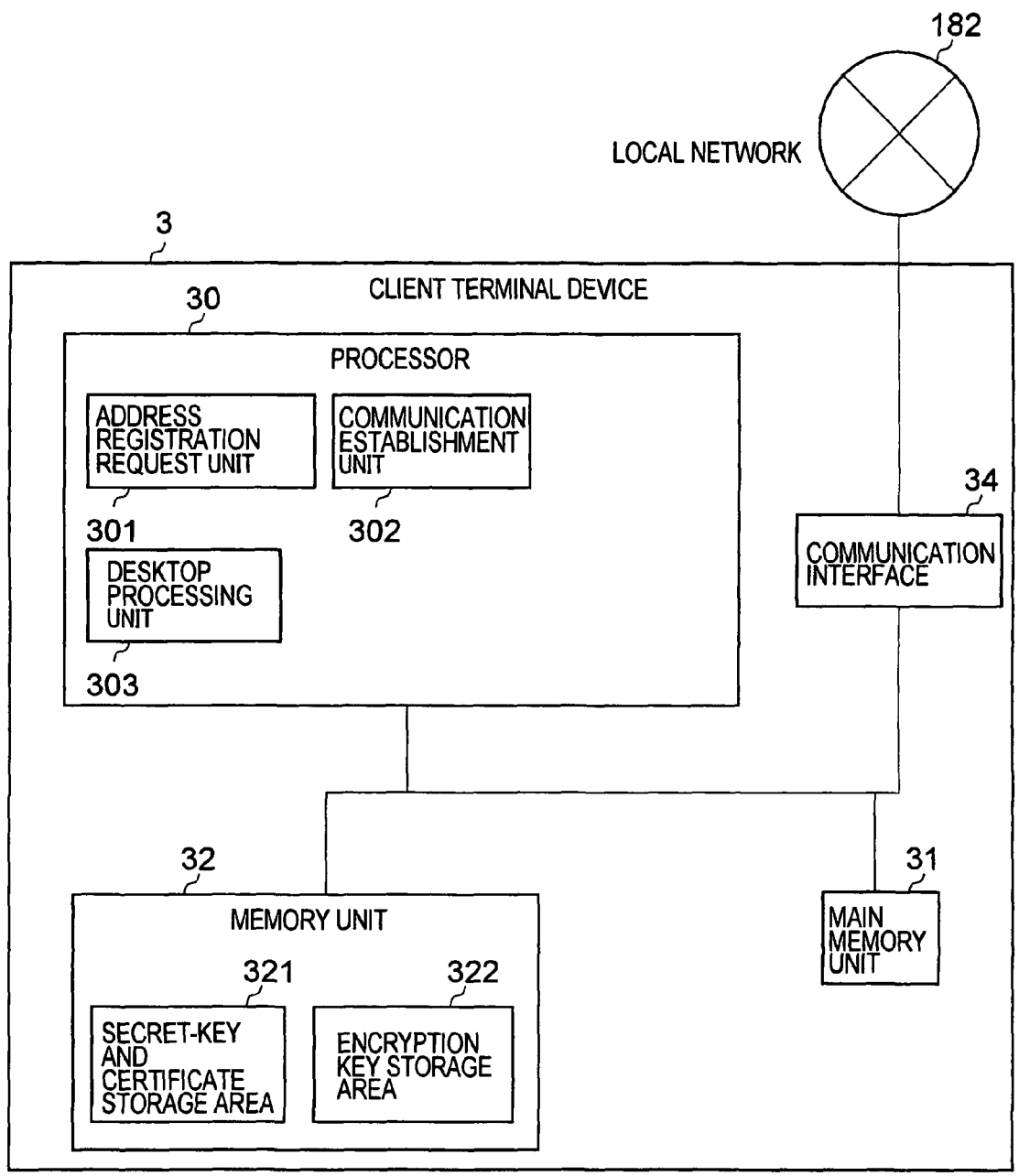
FIG. 5 is a diagram showing a configuration of a client terminal device.

As shown in FIG. 5, the client terminal device 3 is an information processing terminal having an input and output function, such as a personal computer, and provides the user with data and a working environment (hereinafter, the data and the working environment are collectively referred to as desktop environment) corresponding to the user through the client terminal device 3.

The client terminal device 3 has a network communication function of performing communication with another device through the local network 182 or 183. After logging in the server device 2, the client terminal device 3 exchanges information with the desktop processing unit 204 included in the server device 2, to be able to use a desktop environment provided by the server device 2.

The client terminal device 3 includes a processor 30, a main memory unit 31, a memory unit 32, and a communication interface 34.

The processor 30 includes: an address registration request unit 301 which is used to register, in the session management device 1, an address identifying the position of the client terminal device 3 on the network; a communication establishment unit 302 which performs processing to establish communication with the session management device 1 and also performs communication processing with a communication terminal serving as a communication destination; and a desktop processing unit 303 which exchanges information with the desktop processing unit 204 of the server device 2 and displays the information for the user.

The memory unit 32 stores a secret-key and certificate storage area 321 for storing a secret key of the client terminal device 3 and a public key certificate thereof which are used by the session management device 1 to authenticate the client terminal device 3, and an encryption key storage area 322 for storing an encryption key used to encrypt communication.

Figure 6:
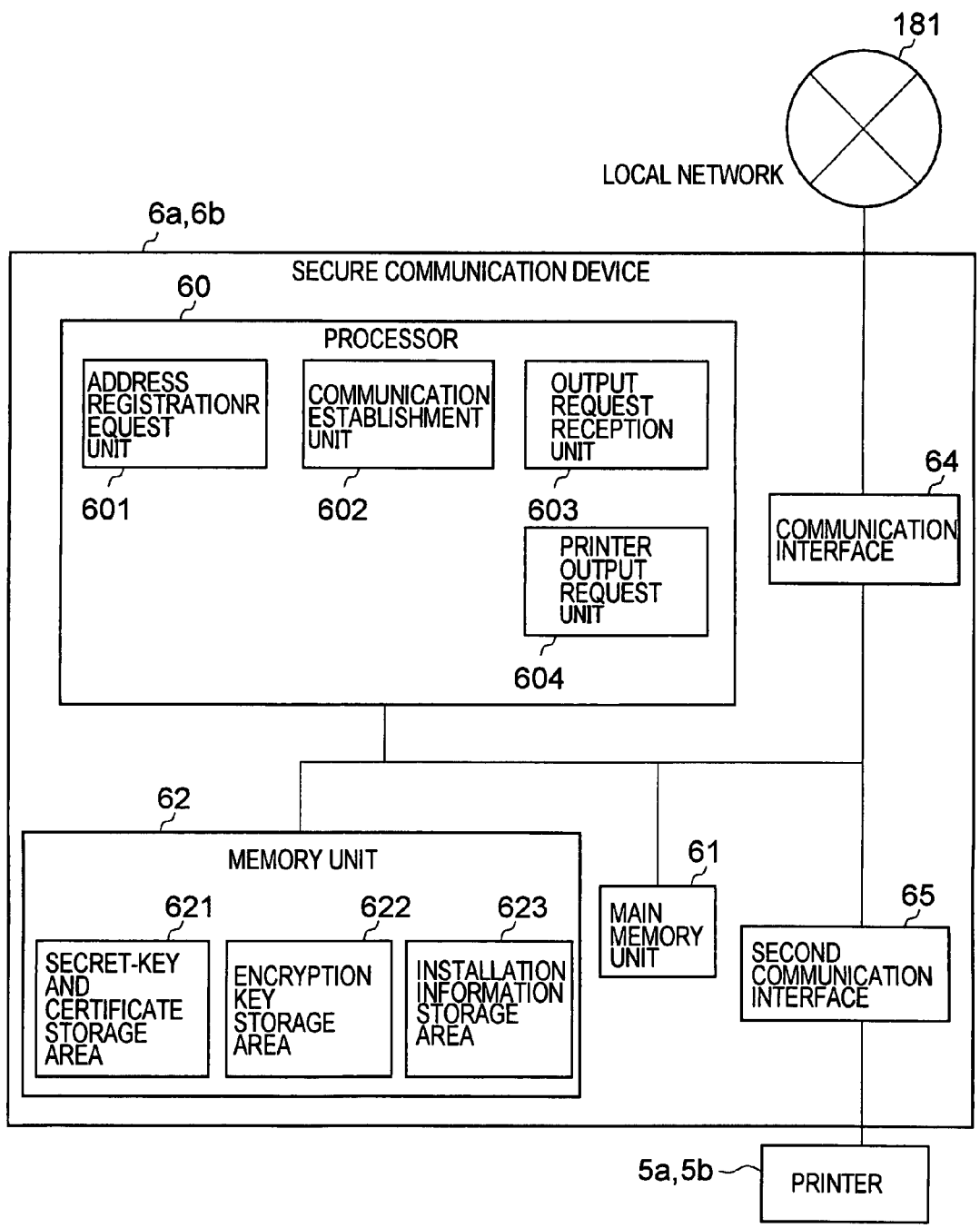
FIG. 6 is a diagram showing a configuration of a secure communication device;.

The secure communication device 6 will be described in more detail with reference to FIG. 6.

The secure communication device 6 includes a processor 60, a main memory unit 61, a memory unit 62, a communication interface 64 used to perform communication with another communication terminal through the local network 182 or 183, and a second communication interface 65 used to perform communication with the printer 5.

The processor 60 includes: an address registration request unit 601 which is used to register an address identifying the position of the secure printer 4 on the network; a communication establishment unit 602 which performs communication processing with the session management device 1 and also performs communication processing with a communication terminal serving as a communication destination; an output request reception unit 603 which receives, when an output request is sent from an external communication terminal, the output request; and a printer output request unit 604 which requests the printer 5 to output data, based on the received output request.

The memory unit 62 stores a secret-key and certificate storage area 621 for storing a secret key of the secure printer 4 and a public key certificate thereof which are used by the session management device 1 to authenticate the secure printer 4, an encryption key storage area 622 for storing an encryption key used to encrypt communication, and an installation information storage area 623 for storing installation environment information of the secure printer 4 and an installation location thereof.

Note that instead of using the secure communication device 6 as an independent device, a device equivalent to the secure communication device 6 may be incorporated in the printer 5 and used.

In this embodiment, the session management device 1 and the server device 2 are connected to the local network 181. However, the session management device 1 and the server device 2 may be connected to the local network 182 or 183, which is included in the base different from that of the local network 181.

In this embodiment, the client terminal device 3 is a terminal device to which a desktop environment is provided by the server device 2 and which mainly performs input and output control while the desktop environment is being provided by the server device 2. The client terminal device 3 may be another device which can be connected to the Internet or an internal network and has a communication function. For example, not only routers, personal computers that can alone produce a desktop environment, and personal digital assistants (PDAs), but also home electric appliances, such as televisions, refrigerators, air conditioners, and microwaves, can be communication terminals when a similar configuration is provided therefor.

Next, an operation of the printing system of the first embodiment will be described with reference to FIGS. 7 to 15.

In the printing system of this embodiment, encrypted channels are established between communication terminals (between the client terminal device 3 and the server device 2 and between the server device 2 and the secure printer 4), and printing is performed using the encrypted channels. The encrypted-channel establishment operation is performed between a communication terminal and the session management device 1 and is also performed between communication terminals.

Figure 7:
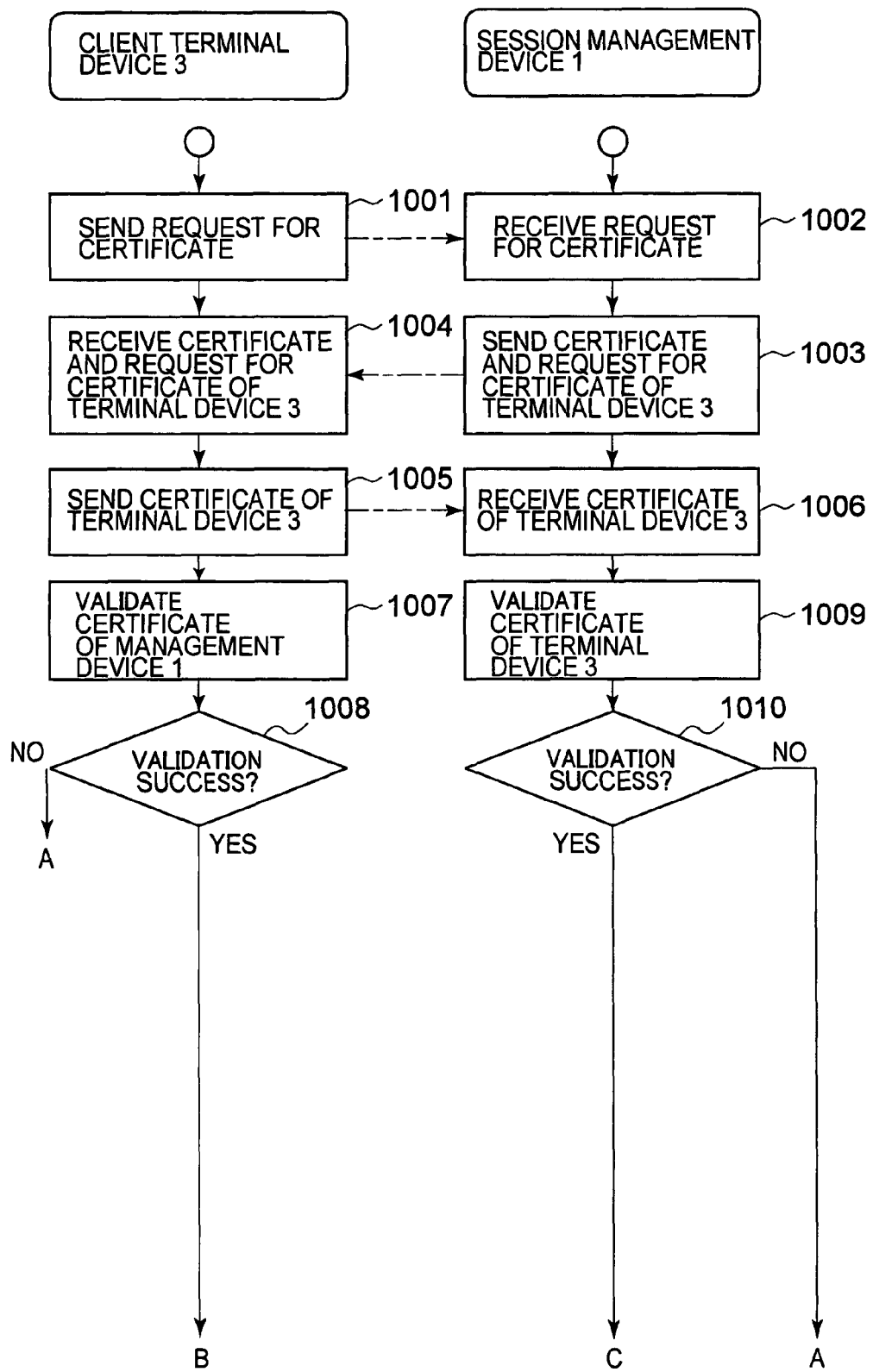
FIG. 7 is a flowchart showing an authentication procedure to establish an encrypted channel between a communication terminal and a management device.
Figure 8:
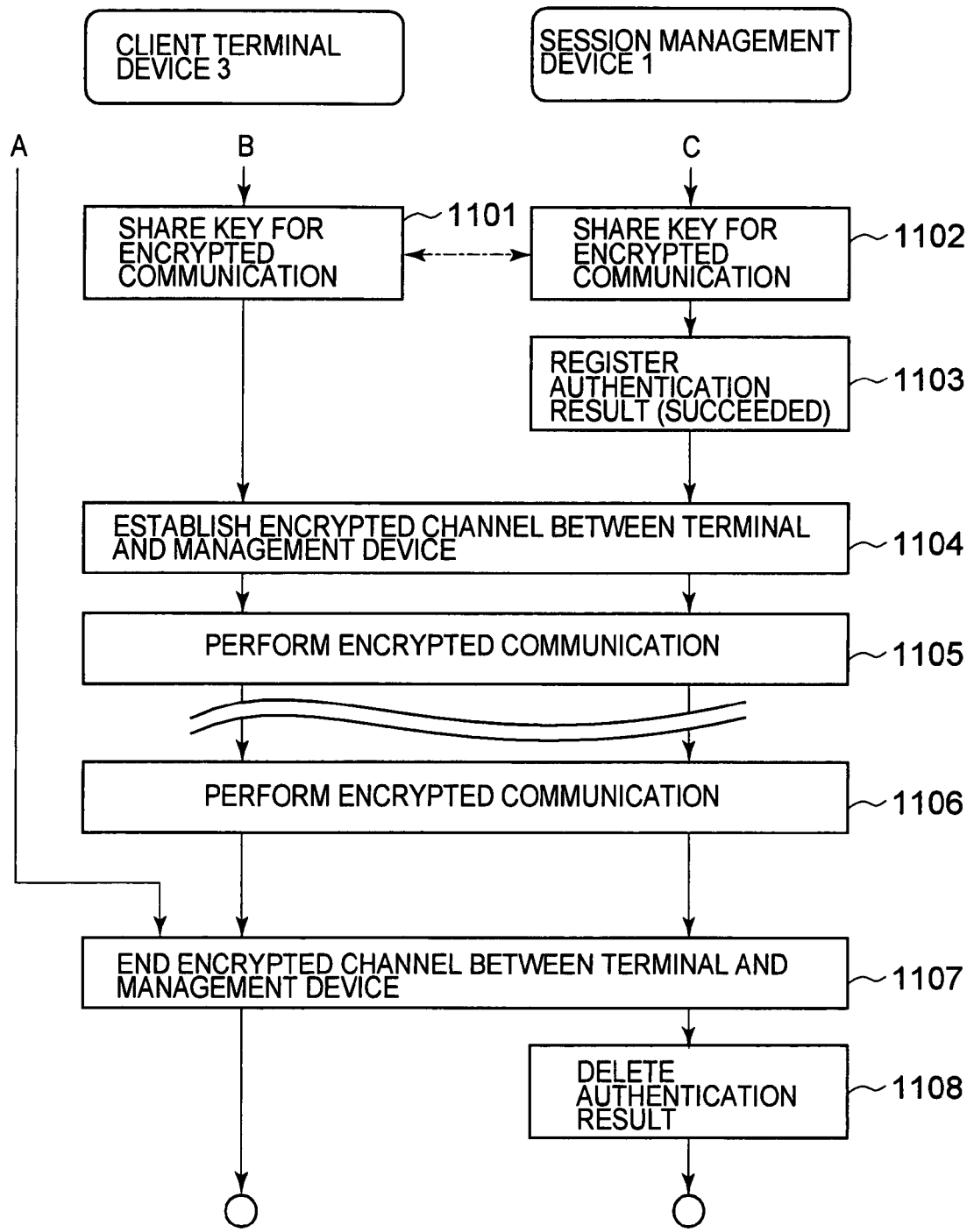
FIG. 8 is a flowchart showing a processing procedure to establish the encrypted channel between the communication terminal and the management device.

FIGS. 7 and 8 are flow diagrams for explaining the encrypted-channel establishment operation performed between a communication terminal and the session management device according to this embodiment, and show an example case where an encrypted channel is established between the client terminal device 3 and the session management device 1 (referred to as "encrypted between-communication-terminal-and-session-management-device channel").

To start communication with the session management device 1, the communication establishment unit 302 of the client terminal device 3 performs authentication. First, the communication establishment unit 302 requests the session management device 1 to send the certificate of the session management device 1 (Step 1001 of FIG. 7). Upon reception of the request (Step 1002), the communication establishment unit 102 of the session management device 1 reads the certificate of the session management device 1 from the secret-key and certificate storage area 122 and sends the certificate to the client terminal device 3. The communication establishment unit 102 also requests the client terminal device 3 to send the certificate of the client terminal device 3 (Step 1003). The communication establishment unit 302 of the client terminal device 3 receives the certificate of the session management device 1 and the request (Step 1004). In response to the request, the communication establishment unit 302 reads the certificate of the client terminal device 3 from the secret-key and certificate storage area 321 and sends the certificate to the session management device 1 (Step 1005).

The client terminal device 3 validates the certificate of the session management device 1 received in Step 1004 (Step 1007) to check that another device is not masquerading as the session management device 1. When the client terminal device 3 does not succeed in the validation of the certificate of the session management device 1 (No in Step 1008), the client terminal device 3 ends the communication (Step 1107 of FIG. 8) because the session management device 1 was not authenticated. When the client terminal device 3 succeeds in the validation of the certificate of the session management device 1 (Yes in Step 1008), the operation advances to the next step.

The session management device 1 receives the certificate from the client terminal device 3 (Step 1006) and validates the certificate (Step 1009).

The session management device 1 evaluates a validataion result, and, when the validataion result does not indicate an authenticated user (No in Step 1010), ends the communication (Step 1107) because the client terminal device 3 was not authenticated. When the validataion result of the certificate of the client terminal device 3 indicates an authenticated user (Yes in Step 1010), the operation advances to the next step.

When the client terminal device 3 and the session management device 1 have succeeded in the mutual authentication (Yes in Step 1008 and Yes in Step 1010), the client terminal device 3 and the session management device 1 share a secret key used to encrypt a channel (Step 1101 and Step 1102 of FIG. 8).

To share a secret key and establish an encrypted channel, a method using Transport Layer Security (TLS), which is standardized as RFC2246 in IETF, can be used, for example. TLS is a standard for a method of performing authentication and key exchange prior to communication and thereafter encrypting or decrypting a channel using the key.

When the secret key is shared, which indicates that the authentication and the encrypted-channel establishment have been performed between the client terminal device 3 and the session management device 1. Thus, the communication establishment unit 102 of the session management device 1 registers the certificate of the client terminal device 3 and the authentication result (indicating that authentication has been successfully performed, in this case) in the address storage area 123, in association with each other (Step 1103).

Accordingly, the processing of establishing an encrypted channel between the client terminal device 3 and the session management device 1 has been completed (Step 1104), and the client terminal device 3 and the session management device 1 are allowed to perform encrypted communication by using the secret key (Steps 1105 and 1106).

To end the encrypted communication, the client terminal device 3 and the session management device 1 release the encrypted channel (Step 1107). In this embodiment, releasing the encrypted channel indicates that the encryption key used for the encrypted communication is made invalid.

The communication establishment unit 102 of the session management device 1 deletes, from the address storage area 123, the certificate IP address of the client terminal device 3 and the authentication result, which have been registered in Step 1103.

Through performing the above-mentioned steps, the client terminal device 3 and the session management device 1 can establish or release an encrypted channel after mutually confirming each other.

Next, an encrypted-channel establishment operation performed between communication terminals will be described.

In order to establish an encrypted channel between communication terminals, address information of each of the communication terminals needs to be registered in advance in the session management device 1. The address information associates information identifying a communication terminal (hereinafter, referred to as "terminal ID") with an address indicating the location of the communication terminal on the network (for example, IP address).

A terminal ID needs to be fixed in a single IP network. A fixed ID can identify the terminal in the IP network, and a combination of the fixed ID and the terminal is uniquely used for a certain period of time (for example, one day).

For example, an IP address does not meet the requirements of a terminal ID because the IP address may be changed depending on the location to connect to the network in a case where a portable notebook computer serves as the client terminal device 3.

Fixed information, such as the name of a communication terminal or the MAC address of a communication terminal, can be used as a terminal ID.

In a closed network such as a network configured in a single company, information such as the email address used by the user of the client terminal device 3, the SIP-URI of the client terminal device 3, and the fully qualified domain name (FQDN) of the client terminal device 3 can be used as a terminal ID.

Next, an address registration operation will be described with reference to FIG. 9.

Figure 9:
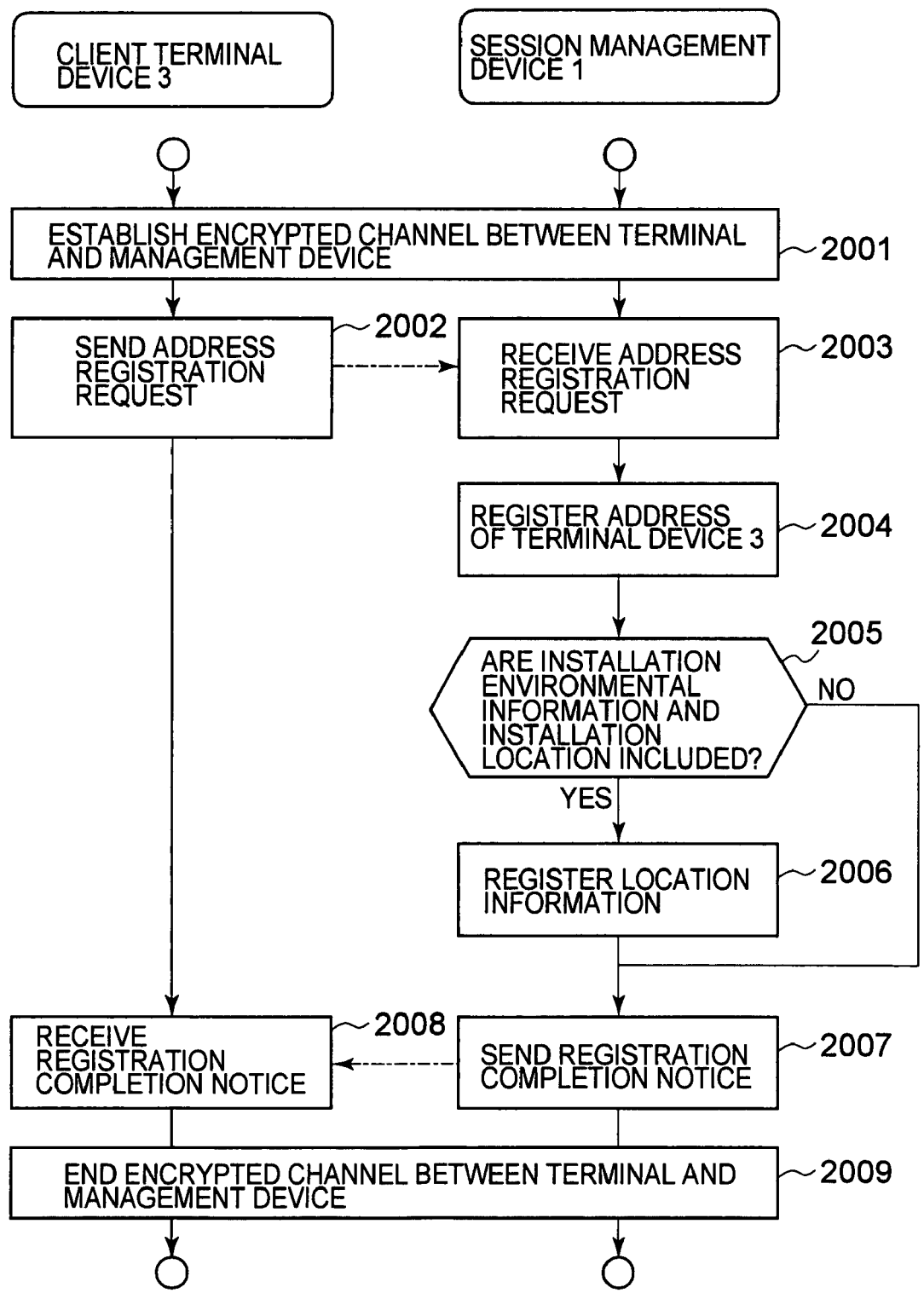
FIG. 9 is a flowchart showing a processing procedure to register an address and position information of the communication terminal.

FIG. 9 is a flow diagram for explaining an operation performed when the client terminal device 3 registers its address in the session management device 1.

First, the client terminal device 3 and the session management device 1 establish an encrypted channel between communication-terminal and session-management-device by performing Steps 1001 to 1104, described above, (Step 2001). After the encrypted channel between communication-terminal and session-management-device channel has been established, the address registration request unit 301 of the client terminal device 3 sends a registration request for the IP address of the client terminal device 3, to the session management device 1 (Step 2002).

The address registration request includes the terminal ID of the client terminal device 3, serving as the communication terminal, and the IP address thereof. When the secure printer 4 serves as the communication terminal, an address registration request includes, in addition to the terminal ID and the IP address of the secure printer 4, installation environment information and an installation location of the secure printer 4. The installation environment information includes an IP address and a subnetmask.

The installation environment information indicates the location where the communication terminal is virtually installed. On the assumption that communication terminals that belong to the same network segment are located close to each other, the IP address and the subnetmask can be used as installation environment information.

In addition, installation environment information can also be an IP address (which is used to determine the same network segment by checking the longest match bit length of the IP address regarded as a bit string); information on the port of a switching hub, to which the communication terminal is connected; the current position information (latitude, longitude, and altitude) obtained by a Global Positioning System (GPS) sensor or the like; or, when the communication terminal is connected to a network by radio(wireless-LAN), the identifier of a radio access point and the position information thereof. Alternatively, a combination of some pieces of the above-mentioned information may be used.

The installation location is a location where the secure printer 4 is installed, and is expressed in natural language or by a map image. The installation location is set in advance in the installation information storage area 623 of the secure printer 4.

For example, a character string, "south side of the 10th floor of the east building", or image data indicating a map surrounding the location where the secure printer 4 is installed, is specified as an installation location. When such information is visually displayed on a screen of the client terminal device 3, a user who will use the secure printer 4 can visually confirm the location of the secure printer 4.

When the installation location of the secure printer 4 is changed, the installation location stored in the installation information storage area 623 of the secure printer 4 just needs to be changed.

Referring back to FIG. 9, the following description will be made.

The communication establishment unit 102 of the session management device 1 receives the address registration request (Step 2003), and registers, in the address storage area 123, the terminal ID and the IP address of the client terminal device 3 in association with the certification of the client terminal device 3 (Step 2004).

When the installation environment information and the installation location are included in the address registration request (Yes in Step 2005), the session management device 1 registers, in the printer management area 121, the installation environment information and the installation location in association with the terminal ID of the secure printer 4 (Step 2006).

Specifically, in the printer management area 121, the terminal ID of the secure printer 4 is stored as the printer identifier 131, the IP address and the subnetmask, which indicate the installation environment information of the secure printer 4, are stored as the installation environment information 132, and the installation location of the secure printer 4 is stored as the installation location 135.

When the installation environment information and the installation location are not included in the address registration request (No in Step 2005), registration of the installation environment information 132 and the installation location 135 is not performed. The operation advances to Step 2007.

After the address registration has been completed as described above, the session management device 1 sends a registration completion notice to the client terminal device 3 (Step 2007). When the client terminal device 3 receives the registration completion notice (Step 2008), the client terminal device 3 and the session management device 1 perform processing to end the encrypted channel between communication-terminal and session-management-device (Step 2009). Through the above-mentioned steps, the address of the client terminal device 3 can be registered in the session management device 1.

Another communication terminal, such as the server device 2, can also register its address in the session management device 1 when the address registration request unit 201 performs the same steps as those of FIG. 9.

Further, the communication terminal can also delete the address registered in the session management device 1. To delete the address, the processing shown in FIG. 9 is performed with "registration" therein being replaced with "deletion."

When the IP address assigned to the communication terminal, and the installation environment information and the installation location of the secure printer 4 are changed, the address registration processing of FIG. 9 needs to be performed again.

When DHCP or the like dynamically assigns an IP address to the communication terminal, the IP address may be changed when the communication terminal is turned off or on or is reset. Further, when the communication terminal is disconnected from the network and connected to another network at a different place, the IP address may be changed. Further, the installation location of the secure printer 4 may also be changed.

In such cases, each communication terminal registers the latest address in the session management device 1 by performing the address registration processing of FIG. 9 again.

Alternatively, to set the IP address and the terminal ID of a communication terminal in a fixed manner, the address of the communication terminal just needs to be registered in advance in the session management device 1.

Figure 10:
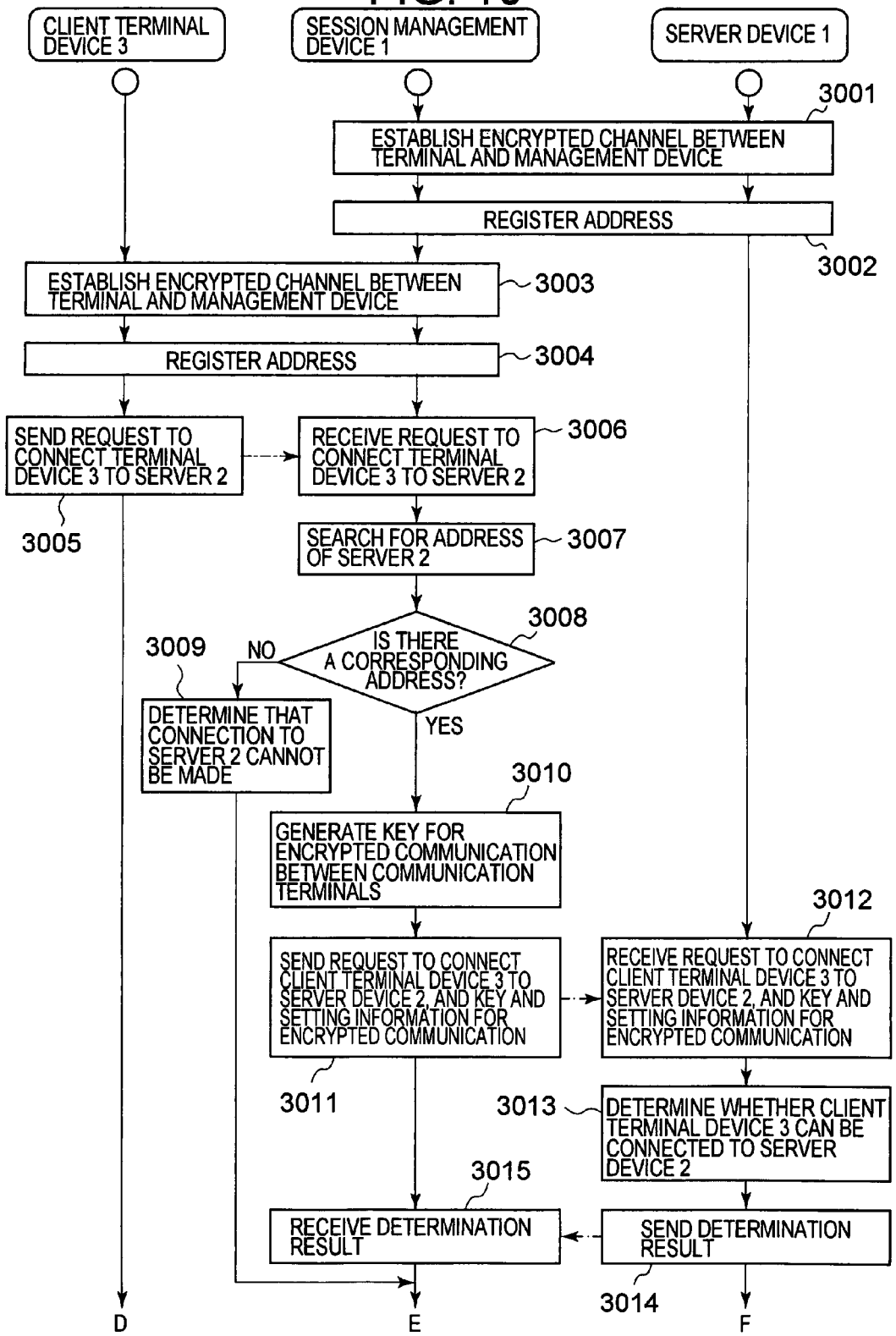
FIG. 10 is a flowchart showing a processing procedure to specify a target for communication performed between communication terminals.
Figure 11:
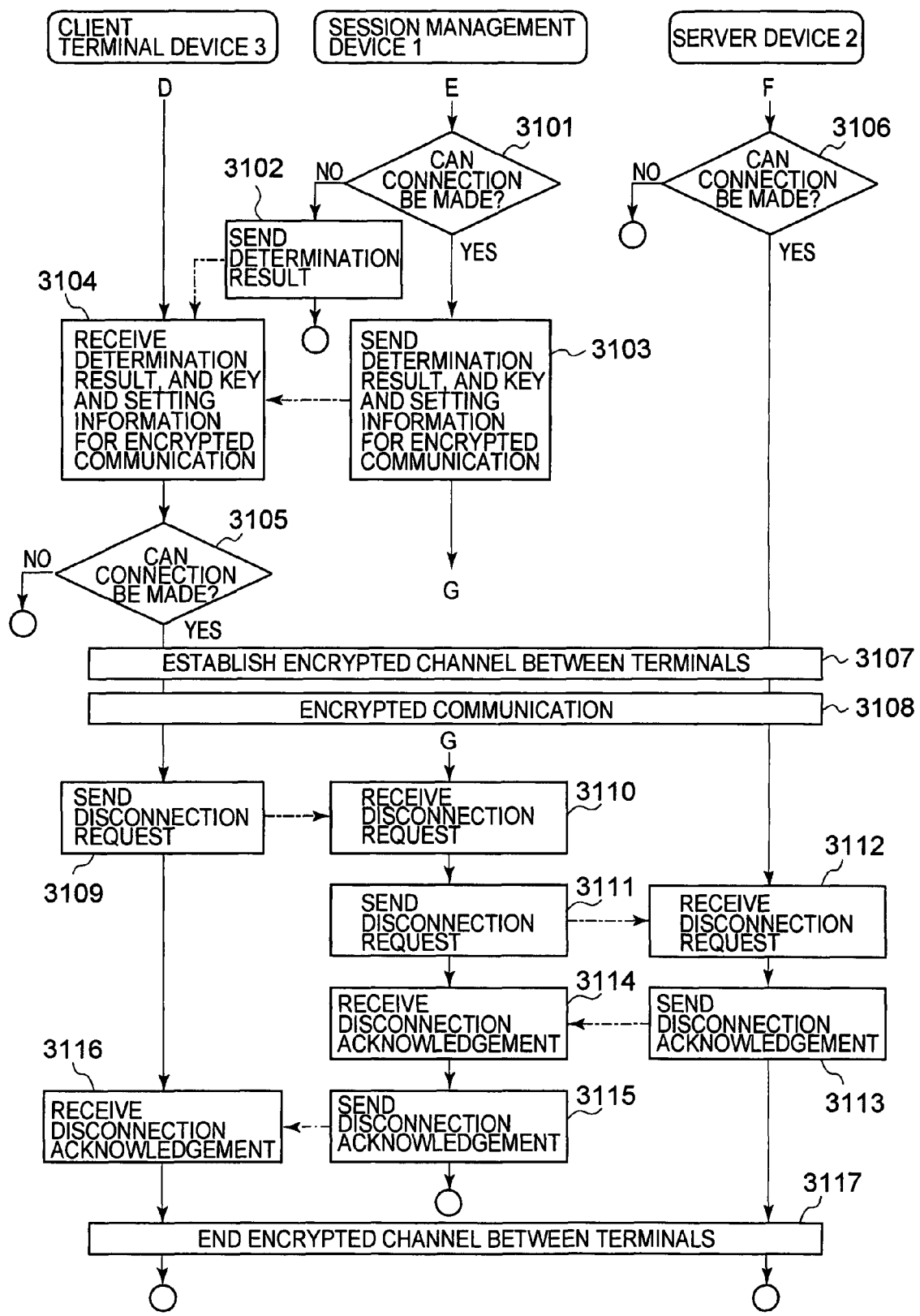
FIG. 11 is a flowchart showing a processing procedure to establish the encrypted channel between the communication terminals.

FIGS. 10 and 11 are flow diagrams showing an operation in which an encrypted channel is established between communication terminals such that encrypted communication can be performed without involving the session management device 1.

The flow diagrams show an example case where an encrypted channel is established between the client terminal device 3 and the server device 2 (referred to as "encrypted between-communication-terminals channel").

First, the server device 2 and the session management device 1 establish an encrypted channel between communication-terminal and session-management-device channel by performing Steps 1001 to 1010 of FIG. 7 and Steps 1101 to 1104 of FIG. 8 in advance (Step 3001). When the server device 2 has not registered its own address in the session management device 1, the address of the server device 2 is registered in the session management device 1 by performing Steps 2002 to 2008 of FIG. 9 (Step 3002).

When the client terminal device 3 is about to start to perform communication with the server device 2, the client terminal device 3 and the session management device 1 establish an encrypted channel between communication-terminal and session-management-device by performing Steps 1001 to 1010 of FIG. 7 and Steps 1101 to 1104 of FIG. 8 (Step 3003).

When the client terminal device 3 has not registered its own address or when the client terminal device 3 has registered its own address but the registered address needs to be updated, the address of the client terminal device 3 is registered or updated in the session management device 1 by performing Steps 2002 to 2008 of FIG. 9 (Step 3004).

After establishing an encrypted channel between the client terminal device 3 and the session management device 1, the client terminal device 3 sends, to the session management device 1, a connection request to connect to the server device 2 (Step 3005). Note that the connection request includes the terminal ID determined in advance to serve as information identifying the connection party (the server device 2).

The communication establishment unit 102 of the session management device 1 receives the connection request (Step 3006), and searches the address storage area 123 for the IP address of the server device 2 by using the terminal ID as a key (Step 3007). As a result of searching the address storage area 123, when IP address information corresponding to the server device 2 has not been registered (No in Step 3008), in other words, when an encrypted channel between the server device 2 and the session management device 1 has not been established and the server device 2 has not been authenticated, the session management device 1 determines that connection to the server device 2 cannot be made (Step 3009), and the operation advances to Step 3101. As a result of searching the address storage area 123, when IP address information corresponding to the server device 2 has been registered (Yes in Step 3008), in other words, when an encrypted channel between the server device 2 and the session management device 1 has been established and the server device 2 has been authenticated, the session management device 1 generates an encryption key and setting information which are used to encrypt a channel between the communication terminals (Step 3010). The session management device 1 sends, to the server device 2, a connection request to connect the client terminal device 3 to the server device 2, and the encryption key and the setting information, which have been generated in Step 3010 (Step 3011). At this time, the connection request, the encryption key, and the like are sent by using the encrypted channel between the server device 2 and the session management device 1.

The communication establishment unit 202 of the server device 2 receives the connection request, the encryption key, and the setting information from the session management device 1 (Step 3012), and stores the encryption key and the setting information in the encryption key storage area 222. The communication establishment unit 202 determines whether the client terminal device 3 can be connected to the server device 2 (Step 3013) and sends a determination result to the session management device 1 (Step 3014). The session management device 1 receives the determination result from the server device 2 (Step 3015).

When the determination result indicates that the client terminal device 3 cannot be connected to the server device 2 (No in Step 3101), the session management device 1 sends the determination result indicating that the client terminal device 3 cannot be connected to the server device 2, to the client terminal device 3 (Step 3102), and ends the processing to establish an encrypted between-communication-terminals channel.

When the determination result indicates that the client terminal device 3 can be connected to the server device 2 (Yes in Step 3101), the session management device 1 sends, to the client terminal device 3, the determination result indicating that the client terminal device 3 can be connected to the server device 2, and the encryption key and the setting information, which have been generated in Step 3010 (Step 3103). At this time, at least the encryption key, among the pieces of information to be sent, is sent by using the encrypted channel between the client terminal device 3 and the session management device 1.

The client terminal device 3 receives, from the session management device 1, the determination result indicating that the client terminal device 3 can be connected to the server device 2, and the like. When further receiving the encryption key from the session management device 1, the client terminal device 3 stores the encryption key in the encryption key storage area 322 (Step 3104).

When the determination result indicates that the client terminal device 3 cannot be connected to the server device 2 (No in Steps 3105 and 3106), the client terminal device 3 and the server device 2 end the processing to establish an encrypted between-communication-terminals channel.

When the determination result indicates that the client terminal device 3 can be connected to the server device 2 (Yes in Steps 3105 and 3106), an encrypted between-communication-terminals channel is established between the client terminal device 3 and the server device 2 (Step 3107). The client terminal device 3 and the server device 2 perform subsequent communication by using this encrypted between-communication-terminals channel (Step 3108).

For the subsequent communication, a desktop environment provided by the desktop processing unit 204 of the server device 2 to the desktop processing unit 303 of the client terminal device 3 is used.

When the encrypted channel between the client terminal device 3 and the server device 2 is no longer necessary, the encrypted between-communication-terminals channel is ended. To end the encrypted between-communication-terminals channel, the following steps need to be performed.

The client terminal device 3 sends a disconnection request to disconnect the encrypted communication with the server device 2, to the session management device 1 (Step 3109). The session management device 1 receives the disconnection request (Step 3110) and sends the received disconnection request to the server device 2 (Step 3111). The server device 2 receives the disconnection request (Step 3112), sends a disconnection acknowledgement corresponding to the disconnection request, to the session management device 1 (Step 3113), and releases the encrypted between-communication-terminals channel used between the server device 2 and the client terminal device 3 (Step 3117).

The session management device 1 receives the disconnection acknowledgement from the server device 2 (Step 3114) and sends the disconnection acknowledgement to the client terminal device 3 (Step 3115). The client terminal device 3 receives the disconnection acknowledgement from the session management device 1 (Step 3116), and ends the encrypted between-communication-terminals channel used between the server device 2 and the client terminal device 3 (Step 3117).

Note that, in the above-mentioned disconnection processing, the disconnection request may be sent from the server device 2 instead of from the client terminal device 3. In that case, it is necessary to perform Steps 3109 to 3117 with the processing contents of the client terminal device 3 being replaced with those of the server device 2.

Further, the client terminal device 3 and the server device 2 do not necessarily perform Steps 3109 to 3117 to end the communication, but may end the communication without performing those steps.

As shown in the flow diagrams of FIGS. 10 and 11, the session management device 1 authenticates the client terminal device 3 and the server device 2 separately, and, when the validity of each of the client terminal device 3 and the server device 2 can be confirmed, establishes the encrypted channel between the client terminal device 3 and the server device 2.

After the encrypted between-communication-terminals channel is established as above, encrypted communication can be performed between communication terminals without involving the session management device 1.

Accordingly, a load is not put on the session management device 1. Further, since the entire channel between communication terminals is encrypted, it is possible to perform more secure communication than that with conventional techniques.

Next, a description will be given of an operation in which, in the printing system of this embodiment, when the client terminal device 3 does some tasks in a desktop environment provided by the server device 2, the client terminal device 3 is operated to print, by using a secure printer 4 adjacent to the client terminal device 3, data stored in the memory unit of the server device 2.

Figure 12:
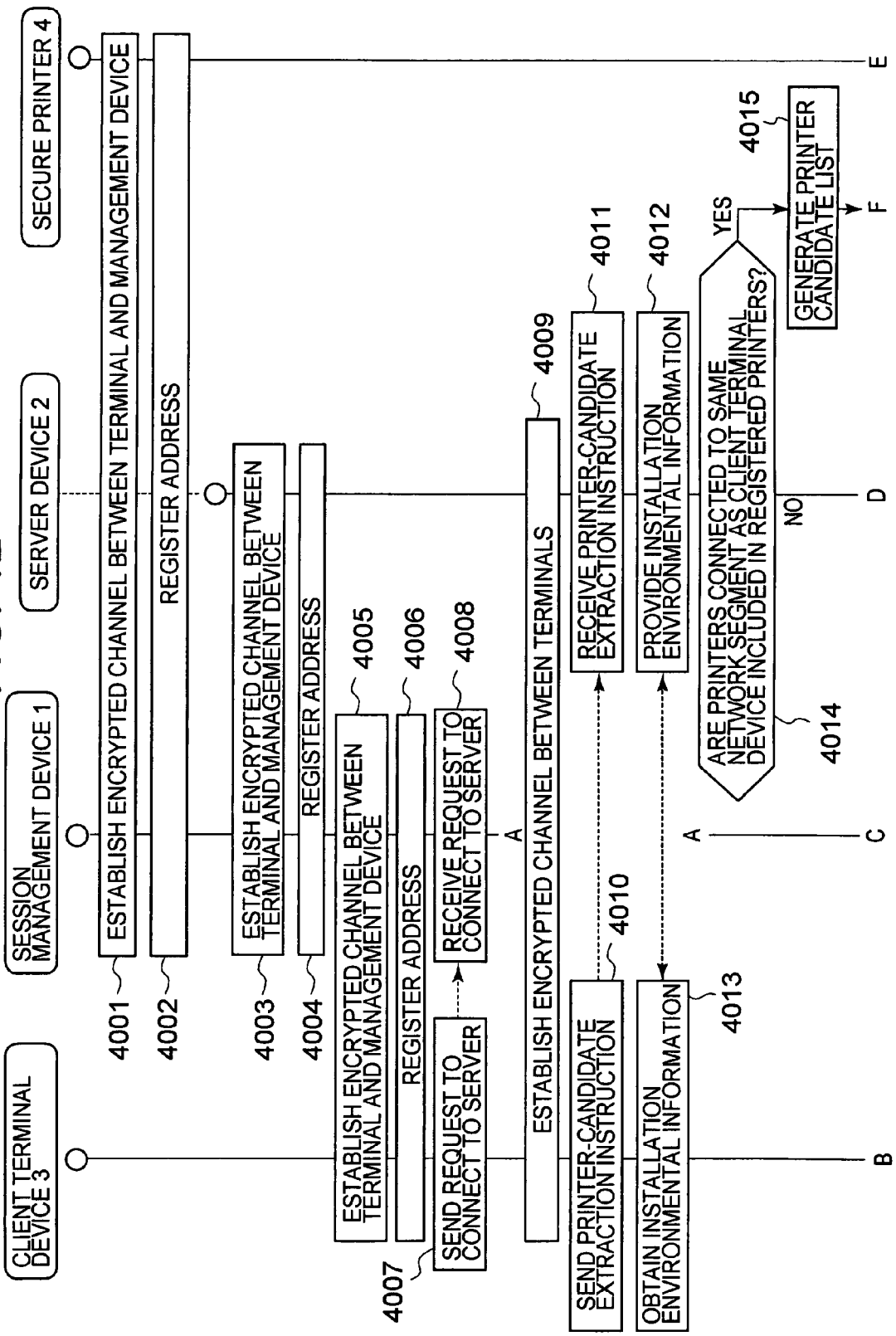
FIG. 12 is a flowchart showing a procedure to send a printer-candidate extraction request.
Figure 13:
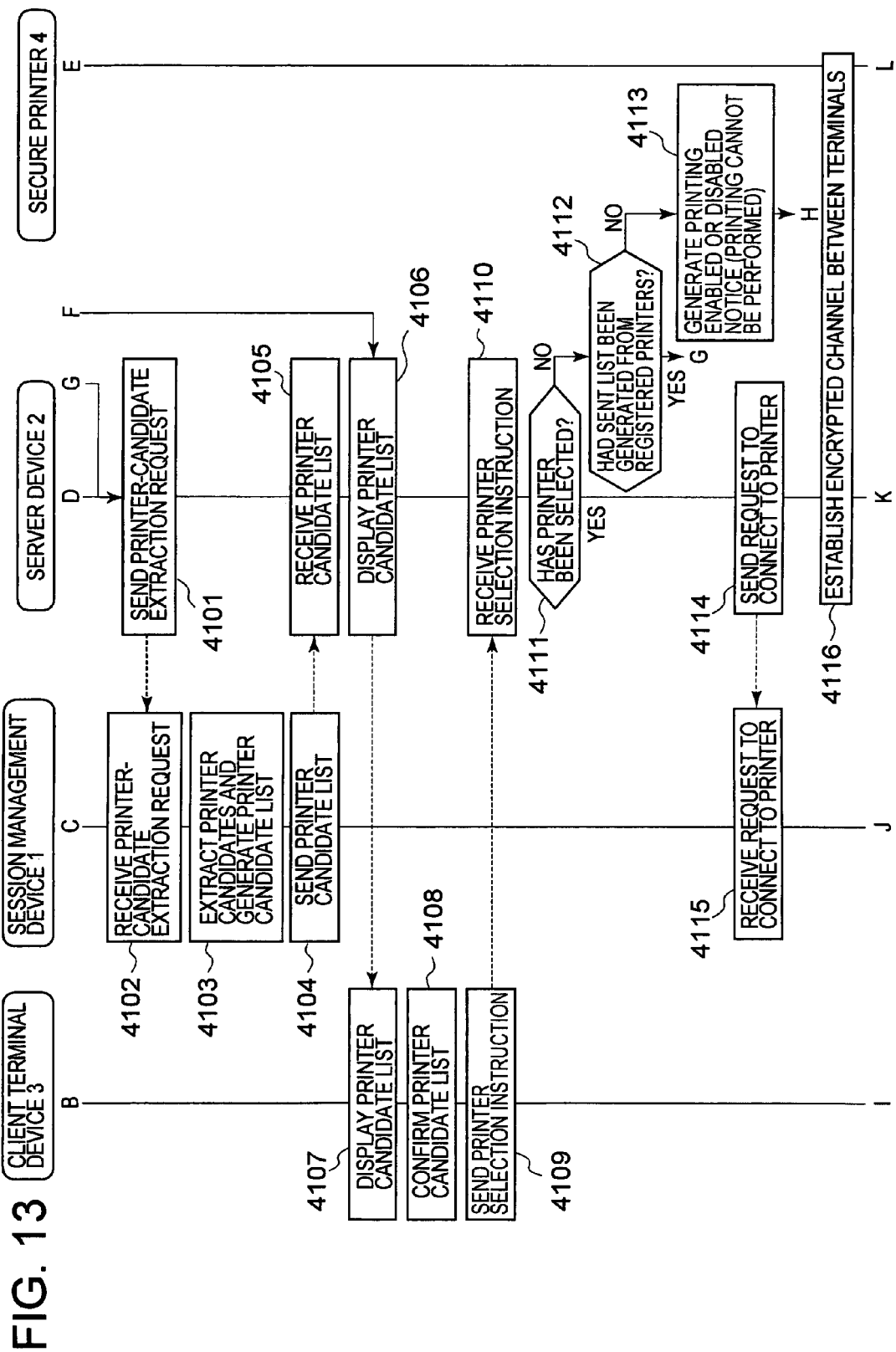
FIG. 13 is a flowchart showing a processing procedure performed up to establishment of an encrypted channel between communication terminals.
Figure 14:
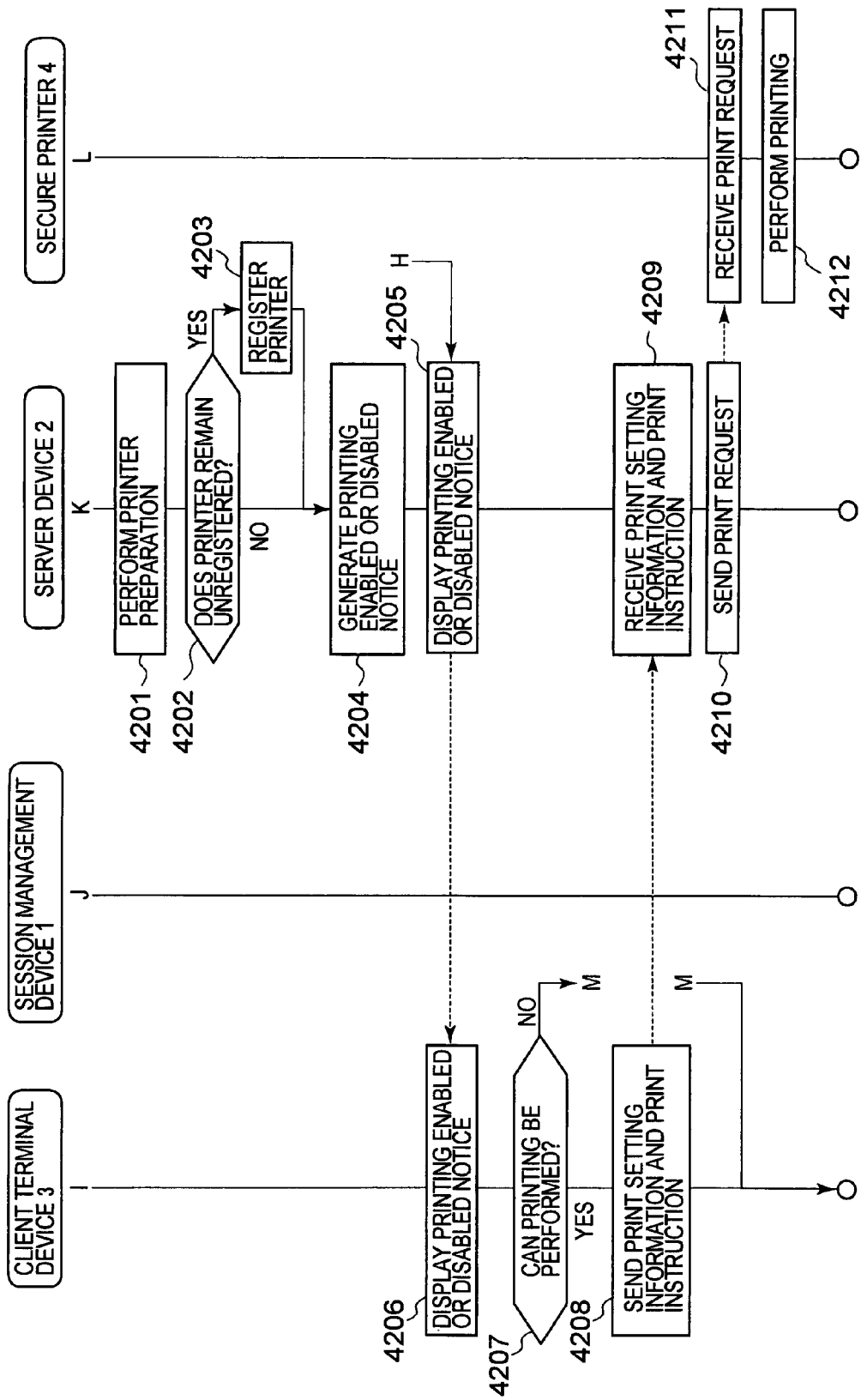
FIG. 14 is a flowchart showing a processing procedure to perform printing by using a selected secure printer.

FIGS. 12, 13, and 14 are flow diagrams for explaining an operation performed when the client terminal device 3 uses an adjacent secure printer 4 to print data stored in the server device 2.

First, the secure printer 4 and the session management device 1 establish an encrypted channel between communication-terminal and session-management-device by similarly performing Steps 1001 to 1010 of FIG. 7 and Steps 1101 to 1104 of FIG. 8 in advance (Step 4001). When the secure printer 4 has not registered its own address in the session management device 1, the address of the secure printer 4 is registered in the session management device 1 by similarly performing Steps 2002 to 2008 of FIG. 9 (Step 4002). Specifically, the terminal ID and the IP address of the secure printer 4 are registered in the address storage area 123 of the session management device 1, and the IP address and the subnetmask being installation environment information of the secure printer 4 and text information or a map indicating the installation location of the secure printer 4 are registered in the printer management area 121 of the session management device 1. Note that the secure printer 4 performs the above-mentioned communication processing by using the communication establishment unit 602 and the address registration request unit 601 of the secure communication device 6.

Further, the server device 2 and the session management device 1 also establish an encrypted channel between communication-terminal and session-management-device by performing Steps 1001 to 1010 of FIG. 7 and Steps 1101 to 1104 of FIG. 8 in advance (Step 4003). When the server device 2 has not registered its own address, the address of the server device 2 is registered in the session management device 1 by performing Steps 2002 to 2008 of FIG. 9 (Step 4004).

Then, when the client terminal device 3 is about to start to perform communication with the server device 2, the client terminal device 3 and the session management device 1 establish an encrypted channel between communication-terminal and session-management-device by performing Steps 1001 to 1010 of FIG. 7 and Steps 1101 to 1104 of FIG. 8 (Step 4005). When the client terminal device 3 has not registered its own address, the address of the client terminal device 3 is registered in the session management device 1 by performing Steps 2002 to 2008 of FIG. 9 (Step 4006).

Next, the client terminal device 3 sends a connection request to connect to the server device 2, to the session management device 1 (Step 4007). The session management device 1 receives the connection request from the client terminal device 3 (Step 4008). The session management device 1, the client terminal device 3, and the server device 2 perform Steps 3007 to 3107 shown in FIGS. 10 and 11 to establish an encrypted between-communication-terminals channel between the client terminal device 3 and the server device 2 (Step 4009). Accordingly, the desktop processing unit 303 of the client terminal device 3 can use a desktop environment provided by the desktop processing unit 204 of the server device 2.

Next, every time data stored in the server device 2 is printed, the desktop environment provided by the server device 2 is operated in the client terminal device 3 to select a printer and perform printing by using the selected printer. Specifically, the client terminal device 3 sends, to the server device 2, an instruction to extract printer candidates from which a secure printer 4 to be used to print data stored in the server device 2 is selected (Step 4010). The printer-candidate extraction instruction is sent by using the encrypted between-communication-terminals channel, which has been established in Step 4009. The server device 2 receives the printer-candidate extraction instruction (Step 4011), and obtains the IP address and the subnetmask being installation environment information of the client terminal device 3 which has sent the printer-candidate extraction instruction (Step 4013)

Upon reception of the printer-candidate extraction instruction, the printer selection unit 203 of the server device 2 compares installation environment information (IP address and subnetmask) stored in the registered-printer storage area 223 with the installation environment information (IP address and subnetmask) of the client terminal device 3 obtained in Step 4013, and determines whether secure printers 4 connected to the same network segment as the client terminal device 3 are included in the registered-printer storage area 223 (Step 4014). When secure printers 4 connected to the same network segment as the client terminal device 3 are included in the registered-printer storage area 223 (Yes in Step 4014), the printer selection unit 203 extracts the secure printers 4 connected to the same network segment and generates a printer candidate list 100 (Step 4015). The operation advances to Step 4106. The printer candidate list 100 includes information as shown in FIG. 15, for example. Specifically, the terminal ID 131, the installation environment information 132, and the installation location 135 of each of the extracted secure printers 4 are described.

When secure printers 4 connected to the same network segment as the client terminal device 3 are not included in the registered-printer storage area 223 (No in Step 4014), the printer selection unit 203 of the server device 2 sends a printer-candidate extraction request to the session management device 1 (Step 4101). The printer-candidate extraction request includes the installation environment information (IP address and subnetmask) of the client terminal device 3.

The printer assignment unit 103 of the session management device 1 receives the printer-candidate extraction request (Step 4102), compares installation environment information of secure printers 4 stored in the printer management area 121 with the installation environment information (IP address and subnetmask) of the client terminal device 3, and extracts secure printers 4 connected to the same network segment as the client terminal device 3. The printer assignment unit 103 generates a printer candidate list 100 based on an extraction result (Step 4103). Then, the session management device 1 sends the printer candidate list 100 to the server device 2 (Step 4104).

The server device 2 receives the printer candidate list 100 from the session management device 1 (Step 4105). The server device 2 displays the printer candidate list 100 received from the session management device 1 or the printer candidate list 100 generated in Step 4103, on a screen of the client terminal device 3 (Step 4106).

The desktop processing unit 303 of the client terminal device 3 displays, to the user, the printer candidate list 100 received from the server device 2 on the screen (Step 4107).

With reference to FIG. 15, a description will be given of items of the printer candidate list 100 to be displayed on the screen of the client terminal device 3.

FIG. 15 shows the items of the printer candidate list 100 to be displayed on the screen.

In the printer candidate list 100, printer name 1701, installation location 1702, and remarks 1703 are displayed in three columns for all printers included in the printer candidate list 100, in which candidates are shown in rows.

Note that, when current position information which is a measurement result of GPS is used as installation environment information, the current position information at which each printer is installed is stored as installation environment information at the time of address registration. The current position information of each printer is compared with the current position information of the connected terminal, and printers which are located at approximately the same altitude (which includes the same altitude) as the terminal and further, for example, which are located within 100 meters in a straight line from the terminal, are extracted to generate the printer candidate list 100.

As the printer name 1701, information stored as the printer identifier 131 of the printer management area 121 of the session management device 1 is displayed. As the installation location 1702, information stored as the installation location 135 of the printer management area 121 is displayed. As the remarks 1703, information stored as the installation environment information 132 of the printer management area 121 is displayed.

The user can visually confirm the pieces of information of the printer name 1701, the installation location 1702, and the remarks 1703 displayed on the client terminal device 3 (Step 4108) and select an appropriate secure printer 4. The user operates the client terminal device 3 to instruct the server device 2 to select the information on the selected secure printer 4 (Step 4109).

The printer selection unit 203 of the server device 2 receives the printer selection instruction (Step 4110) and checks whether a printer has been selected (Step 4111). When no printer has been selected by the user (No in Step 4111), and when the printer candidate list 100 sent to the client terminal device 3 had been generated by extracting printers from registered printers (Yes in Step 4112), the operation returns to Step 4101. In Step 4101, the server device 2 sends a printer extraction instruction to the session management device 1. When the printer candidate list 100 sent to the client terminal device 3 had not been generated by extracting printers from registered printers (No in Step 4112), in other words, when the printer candidate list 100 has been sent from the session management device 1, a notice indicating that printing cannot be performed (that there is no printer which can be used for printing) is generated (Step 4113), and the operation advances to Step 4205.

When any secure printer 4 has been selected by the user (Yes in Step 4111), the server device 2 sends a connection request to connect to the selected secure printer 4, to the session management device 1 (Step 4114). The connection request includes the terminal ID of the secure printer 4 selected by the user. The session management device 1, the server device 2, and the secure printer 4 perform Steps 3007 to 3107 of FIGS. 10 and 11 to establish an encrypted between-communication-terminals channel between the server device 2 and the secure printer 4 (Step 4116).

Next, the server device 2 performs printer preparation so as to be able to use the selected secure printer 4 (Step 4201). Specifically, the printer driver for the selected secure printer 4 is installed and its settings are specified in the server device 2. For printer driver preparation, printer drivers of all secure printers 4 are prepared in advance in the server device 2 or are made ready to be downloaded to the session management device 1, thereby allowing the server device 2 to install all of the printer drivers.

After the printer preparation, the printer selection unit 203 of the server device 2 determines whether the printer has been registered in the registered-printer storage area 223 of the server device 2 (Step 4202). When the printer has not been registered yet (Yes in Step 4202), the printer selection unit 203 registers the printer information in the registered-printer storage area 223 (Step 4203).

The printer selection unit 203 of the server device 2 generates a printing enabled or disabled notice indicating whether printing can be performed (Step 4204) and displays the printing enabled or disabled notice on the client terminal device 3 (Steps 4205 and 4206).

The user of the client terminal device 3 determines whether the printing enabled or disabled notice displayed by the server device 2 indicates that printing can be performed (Step 4207). When the printing enabled or disabled notice indicates that printing cannot be performed (No in Step 4207), the printing processing is ended. When the printing enabled or disabled notice indicates that printing can be performed (Yes in Step 4207), key inputs and the like indicating print setting information and a print instruction are sent to the server device 2 (Step 4208).

The printer selection unit 203 of the server device 2 receives the print setting information and the print instruction from the client terminal device 3 (Step 4209) and sends a print request to the secure printer 4 (Step 4210).

Upon reception of the print request (Step 4211), the output request reception unit 603 of the secure communication device 6 sends received print data to the secure printer 4 from the printer output request unit 604, thereby printing the data (Step 4212).

Through the above-mentioned steps, the client terminal device 3 can print data stored in the server device 2 by using a secure printer 4 located adjacent to the client terminal device 3.

In this embodiment, based on installation environment information, only secure printers 4 located adjacent to the client terminal device 3 can be extracted as candidates from among a large number of secure printers 4, and provided to the user. The user can select an appropriate secure printer 4 from the printer candidates with higher levels of security while confirming displayed installation locations of the printer candidates. Therefore, it is possible to reduce risk of printing being performed by erroneously using a printer connected to another base.

Since communication performed between the server device 2 and the secure printer 4 is encrypted in an end-to-end manner, encrypted communication data can be sent also through a local network to which each of the server device 2 and the secure printer 4 is connected. Therefore, it is possible to perform highly-secure printing as compared to a conventional VPN technique in which only data passing through the network 200 is encrypted.

Further, when the installation environment information and the installation location of a printer are merely registered in the secure communication device 6 of each secure printer 4, position information and installation location information are reflected in the session management device 1 without performing any manual operation. Further, since it is determined, before communication with a secure printer 4 is started, whether the IP address of the secure printer 4 has been registered, it is possible to perform management regarding whether the printer is ready. Accordingly, operability can be improved.

In this embodiment, the session management device 1 performs, in addition to the processing of extracting secure printers 4, the processing of intermediating the processing to establish an encrypted between-communication-terminals channel between the client terminal device 3 and the server device 2 and that between the server device 2 and the secure printer 4. However, the processing performed by the session management device 1 is not limited to those described above.

Specifically, the session management device 1 may perform only the processing of extracting secure printers 4, without performing the processing to establish encrypted between-communication-terminals channels. In that case, it is necessary to perform communication between bases by a conventional method (such as between bases VPN) and to perform registration in the session management device 1 by a different method. Further, the function of the secure communication device 6 does not need to be provided, and a conventional printer can be used as it is.

In this embodiment, the client terminal device 3 uses a desktop environment on the server device 2. However, the configuration is not limited to this. The client terminal device 3 may include the printer selection unit 203 and the registered-printer storage area 223 of the server device 2 and perform processing up to the generation of print data.

The above description has outlined an embodiment of the present invention.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A printer selection assisting device, which assists, in multiple bases which are connected to each other through a network and each of which includes a printer connected to a local network, in selection of a printer to be used for printing in response to a print request from a terminal connected to the local network of any one of the multiple bases, the printer selection assisting device comprising:
   a printer management information storage unit which associates and stores identification information of the printer of each of the multiple bases and installation environment information of the printer;
   a candidate extraction request reception unit which receives through the network, when printing is to be performed, from the terminal connected to the local network of any one of the multiple bases, a printer-candidate extraction request that includes installation environment information of the terminal;
   a printer extraction unit which refers to the printer management information storage unit, and extracts, from multiple printers, the identification information and the installation environment information which are stored in the printer management information storage unit, at least one printer that has installation environment information satisfying a condition determined in advance with respect to the installation environment information of the terminal included in the printer-candidate extraction request received by the candidate extraction request reception unit; and
   an extracted-printer-information transmission unit which sends to the terminal the identification information and the installation environment information of the at least one printer extracted by the printer extraction unit,
   wherein:
   the installation environment information includes at least one of target geographical position information indicating a geographical position of a target, and segment information identifying a network segment that includes the target and in-segment printer identification information identifying a printer in the network segment;
   the condition determined in advance indicates:

that the distance from the terminal to the at least one printer is at most equal to a predetermined distance, when the installation environment information includes the target geographical position information and does not include the segment information and the in-segment printer identification information;

that the at least one printer belongs to the same segment as the terminal, when the installation environment information includes the segment information and the in-segment printer identification information and does not include the target geographical position information; and that one, selected in advance, of the following holds: the distance from the terminal to the at least one printer is at most equal to the predetermined distance, and the at least one printer belongs to the same segment as the terminal depending on a previous selection, when the installation environment information includes the target geographical position information, the segment information, and the in-segment printer identification information;

in the installation environment information, the segment information comprises subnetmask information, and the in-segment printer identification information indicates an Internet Protocol (IP) address; and the condition determined in advance further indicates that, after applying the subnetmask information to the IP address, the at least one printer belongs to the same segment as the terminal.

2. A printer selection assisting device, which assists, in multiple bases which are connected to each other through a network and each of which includes a printer connected to a local network, in selection of a printer to be used for printing in response to a print request from a terminal connected to the local network of any one of the multiple bases, the printer selection assisting device comprising:

a printer management information storage unit which associates and stores identification information of the printer of each of the multiple bases and installation environment information of the printer;

a candidate extraction request reception unit which receives through the network, when printing is to be performed, from the terminal connected to the local network of any one of the multiple bases, a printer-candidate extraction request that includes installation environment information of the terminal;

a printer extraction unit which refers to the printer management information storage unit, and extracts, from multiple printers, the identification information and the installation environment information which are stored in the printer management information storage unit, at least one printer that has installation environment information satisfying a condition determined in advance with respect to the installation environment information of the terminal included in the printer-candidate extraction request received by the candidate extraction request reception unit; and an extracted-printer-information transmission unit which sends to the terminal the identification information and the installation environment information of the at least one printer extracted by the printer extraction unit, wherein:

the installation environment information includes at least one of target geographical position information indicating a geographical position of a target, and segment information identifying a network segment that includes the target and in-segment printer identification information identifying a printer in the network segment;

the condition determined in advance indicates:

that the distance from the terminal to the at least one printer is at most equal to a predetermined distance, when the installation environment information includes the target geographical position information and does not include the segment information and the in-segment printer identification information;

that the at least one printer belongs to the same segment as the terminal, when the installation environment information includes the segment information and the in-segment printer identification information and does not include the target geographical position information; and that one, selected in advance, of the following holds: the distance from the terminal to the at least one printer is at most equal to the predetermined distance, and the at least one printer belongs to the same segment as the terminal depending on a previous selection, when the installation environment information includes the target geographical position information, the segment information, and the in-segment printer identification information;

in the installation environment information, the target geographical position information comprises wireless-Local Area Network (LAN) access point information; and the condition determined in advance further indicates that the at least one printer is installed closest to a location where a wireless-LAN access point, to which the terminal is connected, is installed.

3. A printer selection assisting device, which assists, in multiple bases which are connected to each other through a network and each of which includes a printer connected to a local network, in selection of a printer to be used for printing in response to a print request from a terminal connected to the local network of any one of the multiple bases, the printer selection assisting device comprising:

a printer management information storage unit which associates and stores identification information of the printer of each of the multiple bases and installation environment information of the printer;

a candidate extraction request reception unit which receives through the network, when printing is to be performed, from the terminal connected to the local network of any one of the multiple bases, a printer-candidate extraction request that includes installation environment information of the terminal;

a printer extraction unit which refers to the printer management information storage unit, and extracts, from multiple printers, the identification information and the installation environment information which are stored in the printer management information storage unit, at least one printer that has installation environment information satisfying a condition determined in advance with respect to the installation environment information of the terminal included in the printer-candidate extraction request received by the candidate extraction request reception unit; and an extracted-printer-information transmission unit which sends to the terminal the identification information and the installation environment information of the at least one printer extracted by the printer extraction unit, wherein:

the installation environment information includes at least one of target geographical position information indicating a geographical position of a target, and segment information identifying a network segment that includes the target and in-segment printer identification information identifying a printer in the network segment;
the condition determined in advance indicates:
that the distance from the terminal to the at least one printer is at most equal to a predetermined distance, when the installation environment information includes the target geographical position information and does not include the segment information and the in-segment printer identification information;
that the at least one printer belongs to the same segment as the terminal, when the installation environment information includes the segment information and the in-segment printer identification information and does not include the target geographical position information; and
that one, selected in advance, of the following holds: the distance from the terminal to the at least one printer is at most equal to the predetermined distance, and the at least one printer belongs to the same segment as the terminal depending on a previous selection, when the installation environment information includes the target geographical position information, the segment information, and the in-segment printer identification information;
in the installation environment information, the target geographical position information comprises coordinate information of the at least one printer, which is obtained in advance from a global positioning system; and
the condition determined in advance further indicates that the at least one printer has substantially the same altitude as that of the terminal and is installed at a fixed distance from the terminal.

4. A printer selection assisting system, in which multiple bases connected to each other through a network are provided with local networks, and a printer, a terminal device, and a printer selection assisting device which assists in selection of a printer to be used for printing are connected to any one of the local networks of the multiple bases, the printer selection assisting device comprising:
a management information storage unit which associates and stores identification information of each printer of the multiple bases and installation environment information of the each printer;
an extraction request reception unit which receives through the network, when printing is to be performed, from the terminal device connected to the local network of any one of the multiple bases, a printer-candidate extraction request that includes installation environment information of the terminal device;
a printer extraction unit which refers to the management information storage unit and extracts, from multiple printers, the identification information and the installation environment information which are stored in the management information storage unit, regarding at least one printer that has installation environment information satisfying a condition determined in advance with respect to the installation environment information of the terminal device included in the printer-candidate extraction request received by the extraction request reception unit;
a printer information transmission unit which sends to the terminal device the identification information and the installation environment information of the at least one printer extracted by the printer extraction unit;
a selected-printer reception unit which receives the identification information of the selected one printer sent by a selected-printer transmission unit; and
a communication mediation unit which causes communication to be started between the selected one printer and the terminal device; and
the terminal device comprising:
a printer information reception unit which receives the identification information and the installation environment information of the at least one printer sent from the printer information transmission unit;
an installation environment information processing unit which processes the installation environment information received by the printer information reception unit to generate information for display;
a selected-printer transmission unit which sends identification information of one printer selected based on the installation environment information, to the printer selection assisting device; and
an output data transmission unit which sends print data to the selected one printer.

5. The printer selection assisting system according to claim 4, wherein:
the installation environment information includes at least one of target geographical position information indicating a geographical position of a target, and segment information identifying a network segment that includes the target and in-segment printer identification information identifying a printer in the network segment;
in the installation environment information, the segment information comprises subnetmask information, and the in-segment printer identification information indicates an Internet Protocol (IP) address;
the condition determined in advance indicates that, after applying the subnetmask information to the IP address, the at least one printer belongs to the same segment as the terminal; and
the condition determined in advance further indicates:
that the distance from the terminal to the at least one printer is at most equal to a predetermined distance, when the installation environment information includes the target geographical position information and does not include the segment information and the in-segment printer identification information;
that the at least one printer belongs to the same segment as the terminal, when the installation environment information includes the segment information and the in-segment printer identification information and does not include the target geographical position information; and
that one, selected in advance, of the following holds:
the distance from the terminal to the at least one printer is at most equal to the predetermined distance, and the at least one printer belongs to the same segment as the terminal depending on a previous selection, when the installation environment information includes the target geographical position information, the segment information, and the in-segment printer identification information.

6. The printer selection assisting system according to claim 5, wherein:
in the installation environment information, the target geographical position information comprises wireless-Local Area Network (LAN) access point information; and
the condition determined in advance further indicates that the at least one printer is installed closest to a location where a wireless-LAN access point, to which the terminal is connected, is installed.

7. The printer selection assisting system according to claim 5, wherein:
in the installation environment information, the target geographical position information comprises coordinate information of the at least one printer, which is obtained in advance from a global positioning system; and
the condition determined in advance further indicates that the at least one printer has substantially the same altitude as that of the terminal and is installed at a fixed distance from the terminal.

8. The printer selection assisting system according to claim 5, wherein:
in the installation environment information, the target geographical position information comprises:
wireless-Local Area Network (LAN) access point information; and
coordinate information of the at least one printer, which is obtained in advance from a global positioning system; and
the condition determined in advance further indicates:
that the at least one printer is installed closest to a location where a wireless-LAN access point, to which the terminal is connected, is installed; and
that the at least one printer has substantially the same altitude as that of the terminal and is installed at a fixed distance from the terminal.

9. The printer selection assisting system according to claim 4, wherein the communication started by the communication mediation unit comprises end-to-end encrypted communication performed by the selected one printer and the terminal device.

10. A printer selection assisting method of assisting, by a printer selection assisting device, in selection of a printer to be used for printing, each of the printer selection assisting device, a printer, and a terminal device being connected to any one of local networks provided for multiple bases that are connected to each other through a network,
the printer selection assisting device comprising a processor, wherein the processor is executed to implement the printer selection assisting method comprising steps of:
a management information storage step of causing a storage device to store printer management information which associates identification information of each printer of the multiple bases with installation environment information of the each printer;
an extraction request reception step of receiving, through the network, when printing is to be performed, from the terminal device connected to the local network of any one of the multiple bases, a printer-candidate extraction request that includes installation environment information of the terminal device;
a printer extraction step of referring to the printer management information of the terminal device and extracting, from multiple printers, at least one printer that has installation environment information satisfying a condition determined in advance, with respect to the installation environment information of the terminal device included in the printer-candidate extraction request received in the extraction request reception step;
a printer information transmission step of sending the identification information and the installation environment information of the at least one printer extracted in the printer extraction step, to the terminal device, wherein the terminal device comprises a processor which executes steps of:

a printer information reception step of receiving the identification information and the installation environment information of the at least one printer sent in the printer information transmission step; and
an installation environment information processing step of processing the installation environment information received in the printer information reception step to generate information for display,
wherein:
the installation environment information includes at least one of target geographical position information indicating a geographical position of a target, and segment information identifying a network segment that includes the target and in-segment printer identification information identifying a printer in the network segment;
the condition determined in advance indicates:
that the distance from the terminal to the at least one printer is at most equal to a predetermined distance, when the installation environment information includes the target geographical position information and does not include the segment information and the in-segment printer identification information;
that the at least one printer belongs to the same segment as the terminal, when the installation environment information includes the segment information and the in-segment printer identification information and does not include the target geographical position information; and
that one, selected in advance, of the following holds: the distance from the terminal to the at least one printer is at most equal to the predetermined distance, and the at least one printer belongs to the same segment as the terminal depending on a previous selection, when the installation environment information includes the target geographical position information, the segment information, and the in-segment printer identification information;
in the installation environment information, the segment information comprises subnetmask information and the in-segment printer identification information indicates an Internet Protocol (IP) address; and
the condition determined in advance further indicates that, after applying the subnetmask information to the IP address, the at least one printer belongs to the same segment as the terminal.

11. The printer selection assisting method according to claim 10, wherein:
in the installation environment information, the target geographical position information comprises wireless-Local Area Network (LAN) access point information; and
the condition determined in advance further indicates that the at least one printer is installed closest to a location where a wireless-LAN access point, to which the terminal is connected, is installed.

12. The printer selection assisting method according to claim 10, wherein:
in the installation environment information, the target geographical position information comprises coordinate information of the at least one printer, which is obtained in advance from a global positioning system; and
the condition determined in advance further indicates that the at least one printer has substantially the same altitude as that of the terminal and is installed at a fixed distance from the terminal.

13. The printer selection assisting method according to claim 10, wherein:

in the installation environment information, the segment information comprises subnetmask information and the in-segment printer identification information indicates an Internet Protocol (IP) address;

the condition determined in advance indicates that, after applying the subnetmask information to the IP address, the at least one printer belongs to the same segment as the terminal;

in the installation environment information, the target geographical position information comprises wireless-Local Area Network (LAN) access point information; and the condition determined in advance further indicates that the at least one printer is installed closest to a location where a wireless-LAN access point, to which the terminal is connected, is installed.

14. The printer selection assisting method according to claim 10, wherein:

in the installation environment information, the segment information comprises subnetmask information and the in-segment printer identification information indicates an Internet Protocol (IP) address;

the condition determined in advance indicates that, after applying the subnetmask information to the IP address, the at least one printer belongs to the same segment as the terminal;

in the installation environment information, the target geographical position information comprises coordinate information of the at least one printer, which is obtained in advance from a global positioning system; and the condition determined in advance further indicates that the at least one printer has substantially the same altitude as that of the terminal and is installed at a fixed distance from the terminal.

15. The printer selection assisting method according to claim 10, wherein:

in the installation environment information, the target geographical position information comprises wireless-Local Area Network (LAN) access point information;

the condition determined in advance indicates that the at least one printer is installed closest to a location where a wireless-LAN access point, to which the terminal is connected, is installed;

in the installation environment information, the target geographical position information comprises coordinate information of the at least one printer, which is obtained in advance from a global positioning system; and the condition determined in advance further indicates that the at least one printer has substantially the same altitude as that of the terminal and is installed at a fixed distance from the terminal.

16. The printer selection assisting method according to claim 10, wherein:

in the installation environment information, the segment information comprises subnetmask information and the in-segment printer identification information indicates an Internet Protocol (IP) address;

the condition determined in advance indicates that, after applying the subnetmask information to the IP address, the at least one printer belongs to the same segment as the terminal;

in the installation environment information, the target geographical position information comprises wireless-Local Area Network (LAN) access point information;

the condition determined in advance further indicates that the at least one printer is installed closest to a location where a wireless-LAN access point, to which the terminal is connected, is installed;

in the installation environment information, the target geographical position information comprises coordinate information of the at least one printer, which is obtained in advance from a global positioning system; and the condition determined in advance further indicates that the at least one printer has substantially the same altitude as that of the terminal and is installed at a fixed distance from the terminal.

* * * * *